(12) United States Patent
Sautter et al.

(10) Patent No.: US 9,187,047 B2
(45) Date of Patent: Nov. 17, 2015

(54) RETENTION DOCK

(71) Applicant: Yakima Products, Inc., Beaverton, OR (US)

(72) Inventors: Chris Sautter, Portland, OR (US);
David Condon, Wilsonville, OR (US);
John Mark Elliott, Beaverton, OR (US);
Gian-Marco D'Angelo, Portland, OR (US)

(73) Assignee: Yakima Products, Inc., Beaverton, OR (US)

(*) Notice: Subject to any disclaimer, the term of this patent is extended or adjusted under 35 U.S.C. 154(b) by 0 days.

(21) Appl. No.: 13/873,006

(22) Filed: Apr. 29, 2013

(65) Prior Publication Data
US 2013/0284779 A1    Oct. 31, 2013

Related U.S. Application Data

(60) Provisional application No. 61/640,609, filed on Apr. 30, 2012, provisional application No. 61/678,005, filed on Jul. 31, 2012.

(51) Int. Cl.
*B60R 9/10* (2006.01)
*B60R 9/04* (2006.01)
*B60R 9/045* (2006.01)
(Continued)

(52) U.S. Cl.
CPC ............. *B60R 9/045* (2013.01); *B60R 9/048* (2013.01); *B60R 9/058* (2013.01); *B60R 9/10* (2013.01); *Y10S 224/924* (2013.01)

(58) Field of Classification Search
CPC .......... B60R 9/04; B60R 9/045; B60R 9/052; B60R 9/058; B60R 9/08; B60R 9/048; B60R 9/10; B60P 7/0815; F16B 37/045; B61D 45/001; Y10S 224/924

USPC ............... 224/309, 319, 321–326, 331, 924; 292/26; 248/221.11, 222.13, 222.51, 248/222.52, 225.11, 225.21, 503; 410/104, 410/105; 403/321, 322.1, 322.4
See application file for complete search history.

(56) References Cited

U.S. PATENT DOCUMENTS

| 488,395 A | 12/1892 | Justice |
| 529,827 A | 11/1894 | Fonda |

(Continued)

FOREIGN PATENT DOCUMENTS

| AU | 2003231667 A1 | 2/2004 |
| AU | 2006100386 A4 | 4/2006 |

(Continued)

OTHER PUBLICATIONS

Roof Mounted Bike Racks sold by Bike Racks Plus. [Retrieved on Mar. 20, 2007]. © 2002-2005. Retrieved from the Internet <URL: http://www.bike-racks-plus.com/Roof_Mounted_Bike_Racks_y.htm>.

(Continued)

*Primary Examiner* — Justin Larson
*Assistant Examiner* — Scott McNurlen
(74) *Attorney, Agent, or Firm* — Kolisch Hartwell, P.C.

(57) ABSTRACT

A retention dock device may include a body and one or more clamping assemblies, each clamping assembly operable by an actuator and having a cleat with an enlarged head portion configured to clamp the body of the device to a slotted crossbar of a vehicle rack.

14 Claims, 9 Drawing Sheets

(51) Int. Cl.
  *B60R 9/058*  (2006.01)
  *B60R 9/048*  (2006.01)

(56) References Cited

U.S. PATENT DOCUMENTS

| | | | |
|---|---|---|---|
| 556,789 A | 3/1896 | Walker | |
| 576,351 A | 2/1897 | Penfield | |
| 586,681 A | 7/1897 | Douglas | |
| 607,024 A | 7/1898 | Durfee et al. | |
| 614,264 A | 11/1898 | Fletcher | |
| 615,264 A | 12/1898 | Du Pont | |
| 623,807 A | 4/1899 | Myers | |
| 1,179,823 A | 4/1916 | Greene | |
| 1,433,741 A | 10/1922 | Parker | |
| 1,789,458 A | 1/1931 | Bureau | |
| 2,248,170 A | 7/1941 | Hansen | |
| 2,302,300 A | 11/1942 | Davies | |
| 2,415,286 A | 2/1947 | Hyde | |
| 2,431,400 A | 11/1947 | Iverson | |
| 2,444,422 A | 7/1948 | Bradford | |
| 2,536,797 A | 1/1951 | Cooke | |
| 2,551,218 A | 5/1951 | Menne | |
| 2,573,187 A | 10/1951 | Desilets | |
| 2,723,005 A | 11/1955 | Wink | |
| 2,729,499 A | 1/1956 | Eggum | |
| 2,816,672 A | 12/1957 | Facchini | |
| 2,988,253 A | 6/1961 | Menghi | |
| 3,001,679 A | 9/1961 | Canning et al. | |
| 3,005,213 A | 10/1961 | Brown et al. | |
| 3,042,240 A | 7/1962 | Cline | |
| 3,113,642 A | 12/1963 | Lay | |
| 3,116,836 A | 1/1964 | McCauley | |
| 3,155,249 A | 11/1964 | Johnson | |
| 3,186,569 A | 6/1965 | Roux | |
| 3,190,587 A | 6/1965 | Fries | |
| 3,239,115 A | 3/1966 | Bott et al. | |
| 3,240,406 A | 3/1966 | Logan | |
| 3,276,085 A | 10/1966 | Spranger | |
| 3,300,171 A | 1/1967 | Watts | |
| 3,430,983 A | 3/1969 | Jones | |
| 3,455,472 A | 7/1969 | Rankin, Jr. | |
| 3,460,694 A | 8/1969 | Simms | |
| 3,469,810 A | 9/1969 | Dorris | |
| 3,529,737 A | 9/1970 | Daugherty | |
| 3,554,416 A | 1/1971 | Bott | |
| 3,581,962 A | 6/1971 | Osborn | |
| 3,596,788 A | 8/1971 | Willie | |
| 3,606,432 A | 9/1971 | Honatzis | |
| 3,642,157 A | 2/1972 | Williams, Jr. | |
| 3,677,195 A * | 7/1972 | Prete, Jr. | 410/105 |
| 3,677,451 A | 7/1972 | Burland | |
| 3,737,083 A | 6/1973 | Lund | |
| 3,740,034 A | 6/1973 | Scroggins | |
| 3,744,689 A | 7/1973 | Kjensmo | |
| 3,750,812 A | 8/1973 | Evans | |
| 3,777,922 A | 12/1973 | Kirchmeyer | |
| 3,826,390 A | 7/1974 | Watson | |
| 3,828,993 A | 8/1974 | Carter | |
| 3,843,001 A | 10/1974 | Willis | |
| 3,848,784 A | 11/1974 | Shimano et al. | |
| 3,858,774 A | 1/1975 | Friis | |
| 3,861,533 A | 1/1975 | Radek | |
| 3,892,455 A | 7/1975 | Sotolongo | |
| D238,771 S | 2/1976 | Spokus, Sr. | |
| 3,946,917 A | 3/1976 | Crawford et al. | |
| 3,976,213 A | 8/1976 | Ball | |
| 3,993,167 A | 11/1976 | Reed | |
| 4,022,362 A | 5/1977 | Revercomb | |
| 4,023,761 A | 5/1977 | Molis | |
| 4,034,879 A | 7/1977 | Cudmore | |
| 4,046,297 A | 9/1977 | Bland | |
| 4,058,243 A | 11/1977 | Tappan | |
| 4,081,118 A | 3/1978 | Mason | |
| 4,085,763 A | 4/1978 | Thomas | |
| 4,106,680 A | 8/1978 | Bott | |
| 4,114,409 A | 9/1978 | Scire | |
| 4,126,228 A | 11/1978 | Bala et al. | |
| 4,132,335 A * | 1/1979 | Ingram | 224/324 |
| 4,171,077 A | 10/1979 | Richard, Jr. | |
| 4,213,593 A | 7/1980 | Weik | |
| 4,213,729 A | 7/1980 | Cowles et al. | |
| 4,245,764 A | 1/1981 | Kowalski et al. | |
| 4,264,025 A | 4/1981 | Ferguson et al. | |
| 4,274,569 A | 6/1981 | Winter et al. | |
| 4,274,570 A | 6/1981 | Bott | |
| 4,277,009 A | 7/1981 | Bott | |
| 4,326,655 A | 4/1982 | Gradek et al. | |
| 4,350,380 A | 9/1982 | Williams | |
| 4,358,037 A | 11/1982 | Heideman | |
| 4,402,442 A | 9/1983 | Martino | |
| 4,403,716 A | 9/1983 | Carlson et al. | |
| 4,406,386 A | 9/1983 | Rasor et al. | |
| 4,437,597 A | 3/1984 | Doyle | |
| 4,442,961 A | 4/1984 | Bott | |
| 4,448,337 A | 5/1984 | Cronce | |
| 4,449,656 A | 5/1984 | Wouden | |
| 4,487,348 A | 12/1984 | Mareydt | |
| 4,524,893 A | 6/1985 | Cole | |
| 4,586,638 A | 5/1986 | Prescott et al. | |
| 4,588,117 A | 5/1986 | Bott | |
| 4,589,622 A | 5/1986 | Hutter | |
| 4,616,771 A | 10/1986 | Heideman | |
| 4,629,104 A | 12/1986 | Jacquet | |
| 4,630,990 A | 12/1986 | Whiting | |
| 4,640,450 A | 2/1987 | Gallion et al. | |
| 4,684,049 A | 8/1987 | Maby et al. | |
| 4,700,873 A | 10/1987 | Young | |
| 4,702,398 A | 10/1987 | Seager | |
| 4,702,401 A | 10/1987 | Graber et al. | |
| 4,717,165 A | 1/1988 | Johnson | |
| 4,721,239 A | 1/1988 | Gibbs, III et al. | |
| D294,340 S | 2/1988 | Robson | |
| 4,724,692 A | 2/1988 | Turin et al. | |
| 4,751,891 A | 6/1988 | Wilson | |
| 4,757,929 A | 7/1988 | Nelson | |
| 4,778,092 A | 10/1988 | Grace | |
| 4,789,145 A | 12/1988 | Wenrich | |
| D300,734 S | 4/1989 | Kruitbosch | |
| 4,817,838 A | 4/1989 | Kamaya | |
| 4,823,997 A | 4/1989 | Krieger | |
| 4,830,249 A | 5/1989 | Mirenda et al. | |
| 4,830,250 A | 5/1989 | Newbold et al. | |
| 4,848,794 A | 7/1989 | Mader et al. | |
| 4,875,608 A | 10/1989 | Graber | |
| 4,877,169 A | 10/1989 | Grim | |
| 4,887,754 A | 12/1989 | Boyer et al. | |
| 4,892,279 A | 1/1990 | Lafferty et al. | |
| 4,895,096 A | 1/1990 | Goodwin et al. | |
| 4,911,348 A | 3/1990 | Rasor et al. | |
| 4,917,428 A | 4/1990 | Sola | |
| 4,934,572 A | 6/1990 | Bowman et al. | |
| 4,960,356 A | 10/1990 | Wrenn | |
| 4,961,524 A | 10/1990 | Hunts | |
| 4,964,287 A | 10/1990 | Gaul | |
| 4,976,123 A | 12/1990 | Ceron et al. | |
| 4,993,615 A | 2/1991 | Arvidsson | |
| 4,995,538 A | 2/1991 | Marengo | |
| 4,997,332 A | 3/1991 | Johnson | |
| 5,005,390 A | 4/1991 | Giannini et al. | |
| 5,025,932 A | 6/1991 | Jay | |
| 5,025,967 A | 6/1991 | Cronce et al. | |
| 5,029,740 A | 7/1991 | Cox | |
| 5,037,019 A | 8/1991 | Sokn | |
| 5,038,988 A | 8/1991 | Thulin | |
| 5,042,705 A | 8/1991 | Johansson | |
| 5,052,605 A | 10/1991 | Johansson | |
| 5,056,700 A | 10/1991 | Blackburn et al. | |
| 5,065,921 A | 11/1991 | Mobley | |
| 5,118,020 A | 6/1992 | Piretti | |
| 5,118,125 A | 6/1992 | Plunkett | |
| 5,119,654 A | 6/1992 | Ceron et al. | |
| 5,123,147 A | 6/1992 | Blair | |
| 5,131,669 A | 7/1992 | Kinnamon et al. | |
| 5,136,709 A | 8/1992 | Shirakabe et al. | |

(56) References Cited

U.S. PATENT DOCUMENTS

| | | |
|---|---|---|
| 5,137,195 A | 8/1992 | Walter |
| 5,169,042 A | 12/1992 | Ching |
| 5,169,044 A | 12/1992 | Englander |
| 5,201,487 A | 4/1993 | Epplett |
| 5,203,483 A | 4/1993 | Cucheran |
| 5,205,453 A | 4/1993 | Pudney et al. |
| 5,207,365 A | 5/1993 | Bott |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |
| 5,226,634 A | 7/1993 | Rudy, Jr. et al. |
| 5,230,449 A | 7/1993 | Collins et al. |
| 5,232,134 A | 8/1993 | Allen |
| 5,236,153 A | 8/1993 | LaConte |
| 5,244,101 A | 9/1993 | Palmer et al. |
| 5,253,913 A | 10/1993 | Metivier |
| 5,257,710 A | 11/1993 | Cropley |
| 5,259,542 A | 11/1993 | Newbold et al. |
| 5,275,319 A | 1/1994 | Ruana |
| 5,275,320 A | 1/1994 | Duemmler |
| 5,282,560 A | 2/1994 | Ozog |
| 5,282,562 A | 2/1994 | Legault |
| 5,284,282 A | 2/1994 | Mottino |
| 5,291,763 A | 3/1994 | Cuisinot |
| 5,294,033 A | 3/1994 | Duemmler |
| 5,314,104 A | 5/1994 | Lee |
| 5,320,264 A | 6/1994 | Weir |
| D349,680 S | 8/1994 | Powell |
| D350,527 S | 9/1994 | Parlor, Sr. |
| 5,346,355 A | 9/1994 | Riemer |
| 5,360,150 A | 11/1994 | Praz |
| 5,388,938 A | 2/1995 | Helton |
| 5,416,957 A | 5/1995 | Renzi, Sr. et al. |
| 5,433,550 A * | 7/1995 | Huber ............................ 403/348 |
| 5,435,475 A | 7/1995 | Hudson et al. |
| 5,442,840 A | 8/1995 | Ewald |
| 5,443,190 A | 8/1995 | Cucheran et al. |
| 5,445,300 A | 8/1995 | Eipper et al. |
| 5,456,396 A | 10/1995 | Allen |
| 5,456,512 A | 10/1995 | Gibbs et al. |
| 5,458,268 A | 10/1995 | Hill |
| 5,471,714 A | 12/1995 | Olson |
| 5,474,218 A | 12/1995 | Arsenault, Jr. et al. |
| 5,492,258 A | 2/1996 | Brunner |
| 5,499,762 A | 3/1996 | Lee |
| D369,140 S | 4/1996 | Sills |
| 5,511,894 A | 4/1996 | Ng |
| 5,516,017 A | 5/1996 | Arvidsson |
| 5,526,971 A | 6/1996 | Despain |
| 5,535,930 A | 7/1996 | Lee |
| 5,549,231 A | 8/1996 | Fletcher et al. |
| D373,988 S | 9/1996 | Johnson |
| 5,553,761 A | 9/1996 | Audoire et al. |
| 5,570,825 A | 11/1996 | Cona |
| 5,582,044 A | 12/1996 | Bolich |
| 5,598,959 A | 2/1997 | Lorensen et al. |
| 5,617,617 A | 4/1997 | Gustin |
| 5,624,063 A | 4/1997 | Ireland |
| 5,628,336 A | 5/1997 | Lee |
| 5,647,522 A | 7/1997 | Routh |
| D386,145 S | 11/1997 | Staller |
| 5,692,659 A | 12/1997 | Reeves |
| 5,697,629 A | 12/1997 | Guild |
| 5,701,628 A | 12/1997 | Morad |
| 5,709,521 A | 1/1998 | Glass et al. |
| 5,738,258 A | 4/1998 | Farrow et al. |
| 5,762,248 A | 6/1998 | Englander et al. |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,810,226 A | 9/1998 | Lee |
| 5,820,002 A | 10/1998 | Allen |
| 5,826,765 A | 10/1998 | Rak et al. |
| 5,833,074 A | 11/1998 | Phillips |
| 5,845,828 A | 12/1998 | Settelmayer |
| 5,848,743 A | 12/1998 | Derecktor |
| 5,862,966 A | 1/1999 | Mehls |
| 5,868,621 A | 2/1999 | Parsons |
| 5,875,947 A | 3/1999 | Noel et al. |
| 5,924,614 A | 7/1999 | Kuntze et al. |
| 5,944,198 A | 8/1999 | Ihalainen |
| 5,951,231 A | 9/1999 | Allen |
| 5,984,155 A | 11/1999 | Stapleton |
| 5,988,403 A | 11/1999 | Robideau |
| 5,992,645 A | 11/1999 | West |
| 5,992,805 A | 11/1999 | Tanner |
| 5,996,736 A | 12/1999 | Stankiewicz |
| 6,010,048 A | 1/2000 | Settelmayer |
| 6,015,074 A | 1/2000 | Snavely et al. |
| 6,019,266 A | 2/2000 | Johnson |
| 6,053,336 A | 4/2000 | Reeves |
| 6,062,450 A | 5/2000 | Noel et al. |
| 6,102,265 A | 8/2000 | Stapleton |
| 6,105,841 A | 8/2000 | Aftanas |
| 6,131,781 A | 10/2000 | Murray |
| 6,164,507 A | 12/2000 | Dean et al. |
| 6,176,404 B1 | 1/2001 | Fourel |
| 6,182,876 B1 | 2/2001 | Moliner |
| 6,189,868 B1 | 2/2001 | Santelli, Jr. |
| 6,193,252 B1 | 2/2001 | Lin |
| 6,244,483 B1 | 6/2001 | McLemore et al. |
| 6,273,311 B1 | 8/2001 | Pedrini |
| 6,276,747 B1 | 8/2001 | Ogawa et al. |
| 6,279,802 B1 | 8/2001 | Hickman et al. |
| 6,283,310 B1 | 9/2001 | Dean et al. |
| 6,286,738 B1 | 9/2001 | Robins et al. |
| 6,296,162 B1 | 10/2001 | Englander et al. |
| 6,357,643 B1 | 3/2002 | Janner et al. |
| 6,385,822 B1 | 5/2002 | Dean et al. |
| D460,401 S | 7/2002 | Andersson |
| 6,422,441 B1 | 7/2002 | Settelmayer et al. |
| 6,439,397 B1 | 8/2002 | Reeves |
| 6,460,743 B2 | 10/2002 | Edgerly et al. |
| D467,220 S | 12/2002 | Walstrom et al. |
| 6,488,249 B1 | 12/2002 | Girardi et al. |
| 6,491,195 B1 | 12/2002 | McLemore et al. |
| 6,494,351 B1 | 12/2002 | Dean |
| 6,523,731 B1 | 2/2003 | Pedrini |
| 6,557,931 B1 | 5/2003 | Tremmel et al. |
| 6,561,398 B1 | 5/2003 | Cole et al. |
| 6,622,898 B1 | 9/2003 | Wang |
| 6,640,979 B1 | 11/2003 | Mayfield |
| 6,648,300 B2 | 11/2003 | Chamoun |
| 6,662,982 B1 | 12/2003 | Päkkilä |
| 6,681,971 B2 | 1/2004 | Laverack et al. |
| D487,720 S | 3/2004 | Thomas |
| 6,715,653 B2 | 4/2004 | DeCosta |
| 6,722,541 B1 | 4/2004 | Aftanas et al. |
| 6,736,300 B2 | 5/2004 | Deakin |
| 6,736,301 B1 | 5/2004 | Huang |
| 6,761,297 B1 | 7/2004 | Pedrini |
| 6,769,292 B2 | 8/2004 | Mansky et al. |
| 6,779,696 B2 | 8/2004 | Aftanas et al. |
| 6,793,186 B2 | 9/2004 | Pedersen |
| 6,796,471 B2 | 9/2004 | Aftanas et al. |
| 6,817,500 B2 | 11/2004 | Neaux |
| 6,840,418 B2 | 1/2005 | Robins et al. |
| 6,845,893 B2 | 1/2005 | Nelson |
| 6,845,922 B2 | 1/2005 | Stark |
| 6,857,545 B2 | 2/2005 | McLemore et al. |
| 6,868,998 B2 | 3/2005 | Dean |
| 6,892,913 B1 | 5/2005 | Andersson |
| 6,905,053 B2 | 6/2005 | Allen |
| 6,918,521 B2 | 7/2005 | Settelmayer et al. |
| 6,938,782 B2 | 9/2005 | Dean et al. |
| 6,968,986 B1 | 11/2005 | Lloyd et al. |
| 6,972,042 B2 | 12/2005 | Benson |
| 6,976,615 B2 | 12/2005 | Dean |
| 6,997,657 B1 | 2/2006 | Saward |
| 7,000,811 B2 | 2/2006 | Gilstrap et al. |
| 7,004,365 B2 | 2/2006 | Ingram |
| 7,036,698 B2 | 5/2006 | Allen |

(56) References Cited

U.S. PATENT DOCUMENTS

| | | |
|---|---|---|
| 7,044,347 B1 | 5/2006 | Pedrini |
| 7,051,909 B2 | 5/2006 | Gibson |
| 7,104,430 B2 | 9/2006 | Reeves |
| 7,131,561 B2 | 11/2006 | Humes |
| 7,175,218 B1 | 2/2007 | Keene |
| 7,182,233 B1 | 2/2007 | Graffy et al. |
| 7,201,436 B2 | 4/2007 | Ludwig et al. |
| 7,222,763 B2 | 5/2007 | Pedrini |
| 7,234,617 B2 | 6/2007 | Weaver et al. |
| 7,240,816 B2 | 7/2007 | Tsai |
| D561,680 S | 2/2008 | Foley et al. |
| D562,217 S | 2/2008 | Davis et al. |
| D562,218 S | 2/2008 | Foley et al. |
| 7,328,824 B2 | 2/2008 | Smith et al. |
| D564,438 S | 3/2008 | Moore |
| D566,034 S | 4/2008 | Davis et al. |
| 7,357,283 B2 | 4/2008 | Settelmayer |
| 7,404,504 B2 | 7/2008 | Settelmayer |
| 7,413,143 B2 | 8/2008 | Frantz et al. |
| 7,416,098 B2 | 8/2008 | Settelmayer et al. |
| 7,427,049 B2 | 9/2008 | Kennedy et al. |
| 7,481,344 B2 | 1/2009 | Näslund et al. |
| 7,641,249 B2 | 1/2010 | Jung |
| 7,648,151 B2 | 1/2010 | Pedrini |
| 7,721,925 B1 | 5/2010 | Graffy et al. |
| 7,726,528 B2 | 6/2010 | Foley |
| 7,757,914 B2 | 7/2010 | Book et al. |
| D622,208 S | 8/2010 | Sautter et al. |
| 7,784,656 B2 | 8/2010 | Morrill et al. |
| D623,117 S | 9/2010 | Farber |
| 7,815,084 B2 | 10/2010 | Allen et al. |
| D633,030 S | 2/2011 | Robertson |
| D635,086 S | 3/2011 | Shen |
| D638,778 S | 5/2011 | Giddens |
| D642,113 S | 7/2011 | Farber |
| 7,975,888 B2 | 7/2011 | Settelmayer |
| 8,020,737 B2 | 9/2011 | Sweeney |
| 8,021,169 B1 | 9/2011 | Smith |
| 8,087,557 B2 | 1/2012 | Larsson et al. |
| 8,104,651 B2 | 1/2012 | Bingham |
| 8,113,398 B2 | 2/2012 | Sautter et al. |
| 8,136,708 B2 | 3/2012 | Sautter et al. |
| 8,136,709 B2 | 3/2012 | Jeli et al. |
| D656,887 S | 4/2012 | Bogoslofski et al. |
| 8,196,789 B2 | 6/2012 | Kraeuter et al. |
| 8,210,407 B2 | 7/2012 | Sautter et al. |
| 8,235,267 B2 | 8/2012 | Sautter et al. |
| 8,245,893 B2 | 8/2012 | Sautter et al. |
| D669,017 S | 10/2012 | Robertson |
| 8,333,311 B2 | 12/2012 | Hubbard |
| 8,393,508 B2 | 3/2013 | Sautter et al. |
| 8,408,853 B2 * | 4/2013 | Womack et al. ............. 410/105 |
| 8,505,793 B2 | 8/2013 | Foley |
| 8,544,707 B2 | 10/2013 | Hubbard |
| 8,668,181 B2 | 3/2014 | Dazet et al. |
| D703,605 S | 4/2014 | Sautter et al. |
| 8,763,870 B2 | 7/2014 | Davis |
| D717,722 S | 11/2014 | Cagampang et al. |
| 8,925,775 B2 | 1/2015 | Sautter et al. |
| 2001/0013528 A1 | 8/2001 | Chimenti et al. |
| 2002/0053581 A1 | 5/2002 | Peschmann et al. |
| 2002/0125282 A1 | 9/2002 | Laverack et al. |
| 2003/0071097 A1 | 4/2003 | Dean |
| 2003/0164390 A1 | 9/2003 | Higginbotham, III |
| 2003/0178457 A1 | 9/2003 | Wang |
| 2003/0222112 A1 | 12/2003 | McLemore et al. |
| 2004/0118886 A1 | 6/2004 | Mirshafiee et al. |
| 2004/0211801 A1 | 10/2004 | Barbara |
| 2004/0238582 A1 | 12/2004 | Pedrini |
| 2005/0029320 A1 | 2/2005 | Chimenti et al. |
| 2005/0051585 A1 | 3/2005 | Kamiya et al. |
| 2005/0061842 A1 | 3/2005 | Tsai |
| 2005/0077335 A1 | 4/2005 | Bourne |
| 2005/0145639 A1 | 7/2005 | Viklund et al. |
| 2005/0205626 A1 | 9/2005 | Dean |
| 2005/0284905 A1 | 12/2005 | Naslund et al. |
| 2006/0000859 A1 | 1/2006 | Frischer |
| 2006/0029483 A1 | 2/2006 | Allen et al. |
| 2006/0049324 A1 | 3/2006 | Smith et al. |
| 2006/0060622 A1 | 3/2006 | Prenger |
| 2006/0208022 A1 | 9/2006 | Karlsson |
| 2006/0249466 A1 | 11/2006 | Wang |
| 2006/0273122 A1 | 12/2006 | Bogoslofski et al. |
| 2006/0273123 A1 | 12/2006 | Settelmayer |
| 2006/0273124 A1 | 12/2006 | Bogoslofski |
| 2006/0289577 A1 | 12/2006 | Malone |
| 2007/0036628 A1 | 2/2007 | Womack et al. |
| 2007/0108243 A1 | 5/2007 | Bingham |
| 2007/0119887 A1 | 5/2007 | Foley |
| 2007/0119888 A1 | 5/2007 | Chuang |
| 2007/0164065 A1 | 7/2007 | Davis |
| 2008/0000940 A1 | 1/2008 | Wang |
| 2008/0029563 A1 | 2/2008 | Malone |
| 2008/0053926 A1 | 3/2008 | Foley |
| 2008/0099522 A1 | 5/2008 | Clausen et al. |
| 2008/0101883 A1 | 5/2008 | Derecktor |
| 2008/0164292 A1 | 7/2008 | Farney |
| 2008/0193265 A1 | 8/2008 | Sautter et al. |
| 2008/0257924 A1 | 10/2008 | Kmita et al. |
| 2009/0120982 A1 | 5/2009 | Sautter et al. |
| 2009/0120984 A1 | 5/2009 | Sautter et al. |
| 2009/0159624 A1 | 6/2009 | Johnson et al. |
| 2009/0184189 A1 | 7/2009 | Soderberg et al. |
| 2009/0236382 A1 | 9/2009 | Sautter et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2011/0132946 A1 | 6/2011 | Sautter et al. |
| 2011/0139838 A1 | 6/2011 | Sautter et al. |
| 2011/0139841 A1 | 6/2011 | Sautter et al. |
| 2011/0139842 A1 | 6/2011 | Sautter et al. |
| 2011/0174853 A1 | 7/2011 | Hubbard |
| 2011/0290836 A1 | 12/2011 | Shen |
| 2013/0020361 A1 | 1/2013 | Sautter et al. |
| 2013/0022440 A1 | 1/2013 | Sautter et al. |
| 2013/0037585 A1* | 2/2013 | Hubbard et al. ............. 224/324 |
| 2013/0062379 A1* | 3/2013 | Sautter et al. ............. 224/324 |
| 2013/0062383 A1 | 3/2013 | Jeli |
| 2013/0062385 A1 | 3/2013 | Pedrini |
| 2013/0175308 A1 | 7/2013 | Sautter et al. |
| 2013/0200121 A1 | 8/2013 | Hubbard |
| 2013/0214020 A1 | 8/2013 | Pedrini |
| 2014/0028007 A1 | 1/2014 | Pfeiffer et al. |
| 2014/0124451 A1 | 5/2014 | Urbani et al. |
| 2014/0144958 A1 | 5/2014 | Sautter et al. |
| 2014/0144959 A1 | 5/2014 | Sautter et al. |
| 2014/0144960 A1 | 5/2014 | Condon et al. |
| 2014/0158728 A1 | 6/2014 | Sautter et al. |
| 2014/0158729 A1 | 6/2014 | Pedrini |
| 2014/0166709 A1 | 6/2014 | Hubbard |

FOREIGN PATENT DOCUMENTS

| | | |
|---|---|---|
| AU | 2008301329 B2 | 8/2012 |
| AU | 348922 | 5/2013 |
| AU | 2008301330 B2 | 1/2014 |
| AU | 2008304016 B2 | 1/2014 |
| CN | 87104266 A | 3/1988 |
| CN | 2445963 Y | 9/2001 |
| CN | 101559737 A | 10/2009 |
| CN | 101559738 A | 10/2009 |
| CN | 101868375 A | 10/2010 |
| CN | 201677818 U | 12/2010 |
| CN | 102177047 A | 9/2011 |
| CN | 101861257 B | 11/2012 |
| CN | 101868376 B | 3/2013 |
| CN | 102975661 A | 3/2013 |
| DE | 3209912 A1 | 10/1983 |
| DE | 2940095 A1 | 4/1984 |
| DE | 3637856 A1 | 5/1988 |
| DE | 8801618 U1 | 8/1988 |
| DE | 3912692 A1 | 11/1989 |
| DE | 4229268 A1 | 3/1994 |

(56) References Cited

FOREIGN PATENT DOCUMENTS

| | | |
|---|---|---|
| DE | 4423607 C1 | 6/1995 |
| DE | 20007760 U1 | 8/2000 |
| DE | 20309766 U1 | 10/2003 |
| DE | 202005007566 U1 | 8/2005 |
| EP | 0019873 B1 | 10/1982 |
| EP | 0151907 A2 | 8/1985 |
| EP | 0193501 A2 | 9/1986 |
| EP | 0482650 A1 | 4/1992 |
| EP | 0511179 A1 | 10/1992 |
| EP | 0646074 B1 | 10/1996 |
| EP | 0398885 B2 | 6/1997 |
| EP | 0869879 A1 | 10/1998 |
| EP | 0894672 A1 | 2/1999 |
| EP | 0945307 A2 | 9/1999 |
| EP | 0989029 A1 | 3/2000 |
| EP | 1285817 A2 | 2/2003 |
| EP | 1340652 A1 | 9/2003 |
| EP | 1340653 A2 | 9/2003 |
| EP | 1442940 A1 | 8/2004 |
| EP | 1205358 B1 | 7/2005 |
| EP | 1568542 A1 | 8/2005 |
| EP | 1712420 A1 | 10/2006 |
| EP | 2334514 A | 6/2011 |
| EP | 2437961 A | 4/2012 |
| EP | 2507095 A | 10/2012 |
| EP | 002172445-0001 | 1/2013 |
| EP | 002231878-0001 | 7/2013 |
| EP | 002343582-0001 | 1/2014 |
| EP | 002343756-0001 | 1/2014 |
| EP | 2200869 B1 | 4/2014 |
| EP | 2200867 A1 | 6/2014 |
| EP | 2758275 A1 | 7/2014 |
| EP | 2200868 A1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2632595 A1 | 12/1989 |
| FR | 2711346 A1 | 4/1995 |
| FR | 2752793 A1 | 3/1998 |
| GB | 886743 A | 1/1962 |
| GB | 1045619 A | 10/1966 |
| GB | 1311367 A | 3/1973 |
| GB | 2257463 A | 1/1993 |
| GB | 2277309 A | 10/1994 |
| GB | 2303344 A | 2/1997 |
| JP | 9-20181 A | 1/1997 |
| JP | 10-250488 A | 9/1998 |
| JP | 2000-318538 A | 11/2000 |
| MX | 2011012988 A | 3/2012 |
| NZ | 551764 A | 3/2009 |
| NZ | 561809 A | 11/2009 |
| NZ | 561860 A | 4/2010 |
| NZ | 561811 A | 6/2010 |
| NZ | 571287 A | 3/2011 |
| NZ | 581567 A | 3/2011 |
| TW | 201111201 A | 4/2011 |
| WO | 9110581 A1 | 7/1991 |
| WO | 9624509 A1 | 8/1996 |
| WO | 9638336 A1 | 12/1996 |
| WO | 9702976 A1 | 1/1997 |
| WO | 9708017 A1 | 3/1997 |
| WO | 9810959 A1 | 3/1998 |
| WO | 9954168 A1 | 10/1999 |
| WO | 03006277 A1 | 1/2003 |
| WO | 2005021332 A1 | 3/2005 |
| WO | 2005102013 A2 | 11/2005 |
| WO | 2009038479 A1 | 3/2009 |
| WO | 2009038480 A1 | 3/2009 |
| WO | 2009041828 A1 | 4/2009 |
| WO | 2009158358 A1 | 12/2009 |
| WO | 2009158360 A1 | 12/2009 |
| WO | 2010030198 A1 | 3/2010 |
| WO | 2010141944 A1 | 12/2010 |
| WO | 2010144369 A1 | 12/2010 |
| WO | 2010148011 A1 | 12/2010 |
| WO | 2011084075 A1 | 7/2011 |
| WO | 2013036939 A1 | 3/2013 |
| WO | 2013040267 A1 | 3/2013 |
| WO | 2013164692 A2 | 11/2013 |
| WO | 2013165640 A1 | 11/2013 |
| WO | 2014022435 A1 | 2/2014 |

OTHER PUBLICATIONS

Rack Attack Portland's Blog, "Another hit from Yakima! The all new factory-compatible FrontLoader upright bike rack", Mar. 29, 2010, Retrieved from the Internet on Oct. 11, 2012, URL: http://rackattackportland.wordpress.com/2010/03/29another-hit-from-yakima-the-all-new-factory-compatible-frontloader-upright-bike-rack/, 3 pages.

"Yakima FrontLoader upright bike rack review", Apr. 17, 2010, Retrieved from the Internet on Oct. 11, 2012, URL: http://carracks.blogspot.nl/2010/04/yakima-frontloader-upright-bike-rack.html, 2 pages.

ORS Racks direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.

Heinlen, Jerry, "Yakima FrontLoader Recall Information", Apr. 28, 2011, Retrieved from the Internet on Oct. 11, 2012, URL:http://firecall.yakima.com, 2 pages.

Yakima, "Frontloader", Oct. 11, 2012, Retrieved from the Internet on Oct. 11, 2012, URL:http://yakima.com/shop/bike/roof/frontloader#pr-header-8002103, 5 pages.

The International Bureau of WIPO, International Search Report and Written Opinion of the International Search Authority regarding PCT Application No. PCT/NZ2010/000237, dated Apr. 27, 2011, 10 pages.

The International Bureau of WIPO, Written Opinion of the International Preliminary Authority regarding PCT Application No. PCT/NZ2010/000237, dated Sep. 28, 2011, 6 pages.

The International Bureau of WIPO, International Preliminary Report on Patentability regarding PCT Application No. PCT/NZ2010/000237, dated Apr. 13, 2012, 6 pages.

European Patent Office, Supplementary European Search Report regarding European Patent Application No. 10842325.2, dated Mar. 18, 2013, 7 pages.

Australian Patent Office, Examination Report regarding Australian Patent Application No. 2010340429, dated Sep. 7, 2013, 3 pages.

European Patent Office, Examination Report regarding European Patent Application No. 10842325.2, dated Oct. 29, 2013, 4 pages.

The U.S. Receiving Office of WIPO, International Search Report and Written Opinion of the International Searching Authority relating to PCT Application No. PCT/IB2013/001110, dated Nov. 1, 2014, 16 pages.

U.S. Patent and Trademark Office, Office action regarding U.S. Appl. No. 13/512,267, dated Jul. 25, 2014, 16 pages.

The International Bureau of WIPO, International Preliminary Report on Patentability regarding PCT Application No. PCT/IB2013/001110, mailed Nov. 13, 2014, 12 pages.

U.S. Patent and Trademark Office, Office action regarding U.S. Appl. No. 13/874,294 mailed Dec. 22, 2014, 24 pages.

U.S. Patent and Trademark Office, Office action regarding U.S. Appl. No. 13/874,364 mailed Jan. 6, 2015, 34 pages.

\* cited by examiner

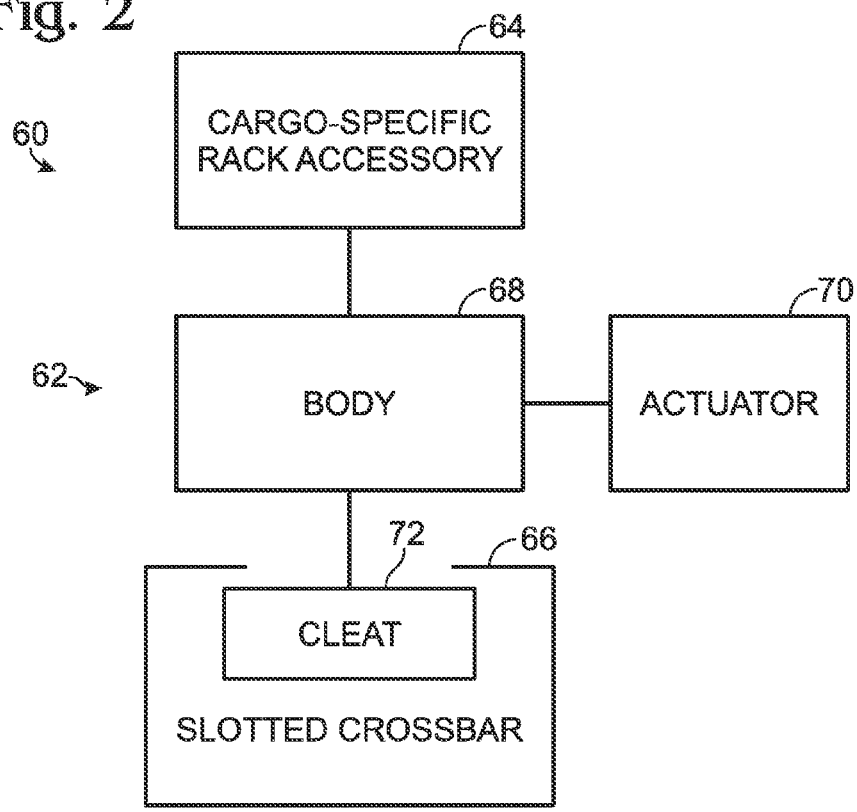
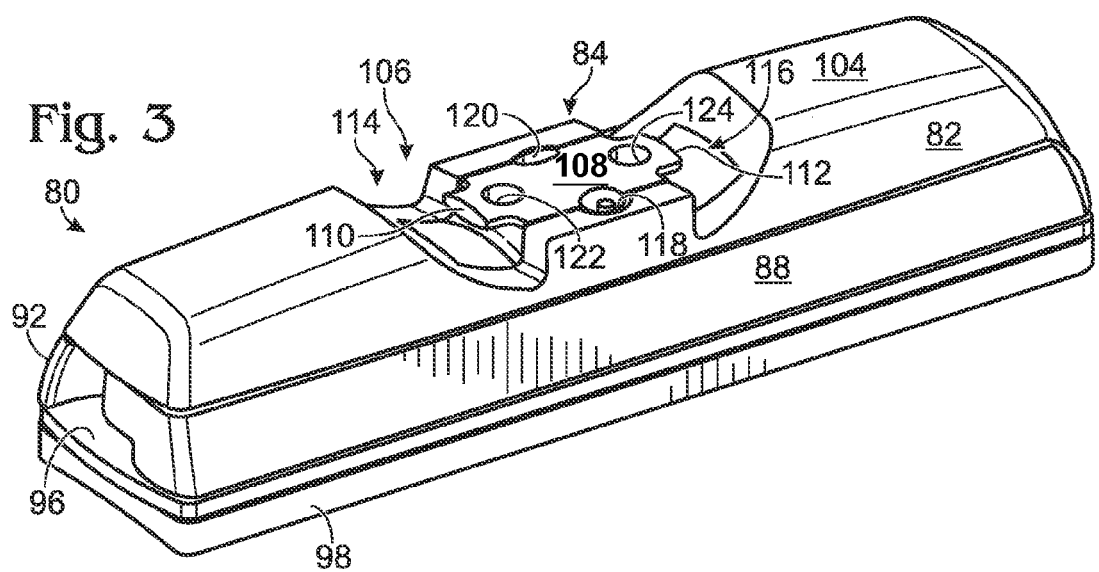

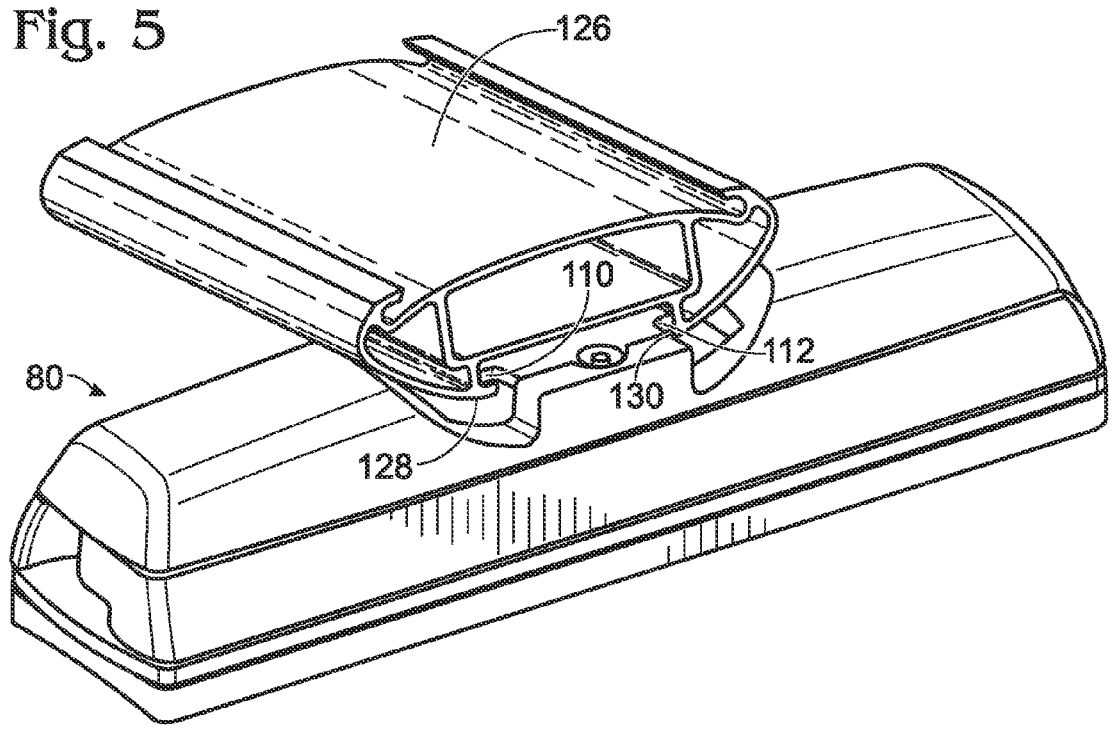
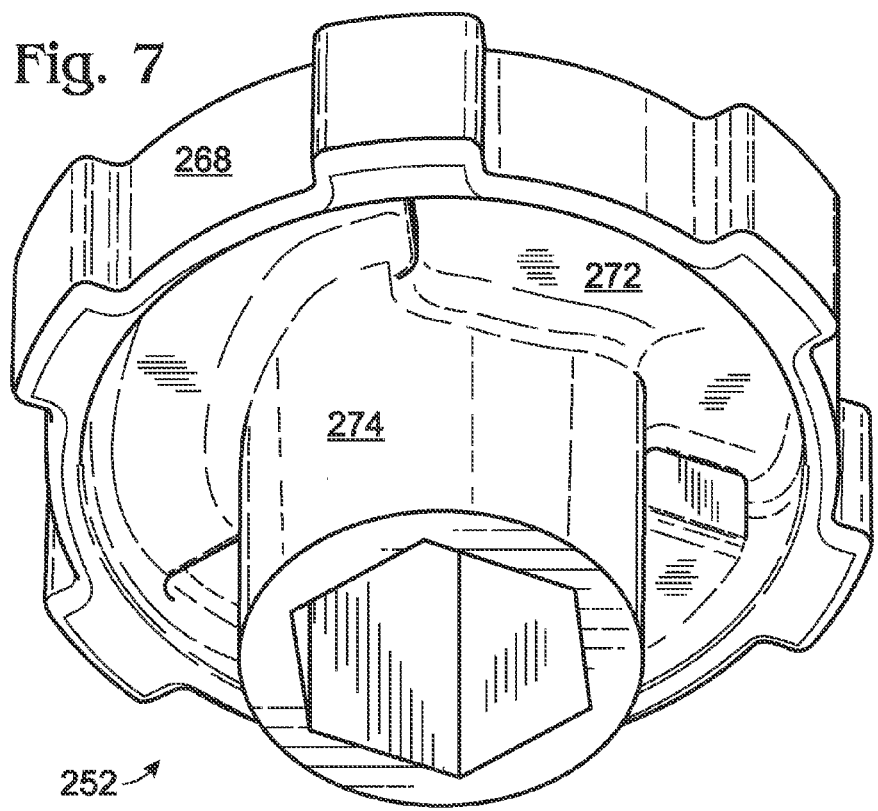

RETENTION DOCK

CROSS REFERENCE TO RELATED APPLICATIONS

This application claims priority under 35 U.S.C. §119(e) to U.S. Provisional Patent Application Ser. No. 61/640,609 filed Apr. 30, 2012 and Ser. No. 61/678,005 filed Jul. 31, 2012, each of which is incorporated herein by reference in its entirety for all purposes.

The following U.S. Patent and Patent Applications are incorporated by reference in their entireties: US-2010-0237116-A1 published Sep. 23, 2010, US-2010-0308091-A1 published Dec. 9, 2010, US-2011-0174853-A1 published Jul. 21, 2011, U.S. Pat. No. 8,333,311 issued Dec. 18, 2012, US-2013-0037585-A1 published Feb. 14, 2013, US-2013-0062379-A1 published Mar. 14, 2013, and Ser. No. 13/855,493 filed Apr. 2, 2013 titled "Vehicle Rack System with a Bicycle-Gripping Carrier".

FIELD

The invention generally relates to devices and methods for clamping accessories to crossbars of vehicle racks.

INTRODUCTION

The popularity of recreational and competitive cycling, canoeing, rafting, kayaking, and skiing has grown substantially in recent years, with a corresponding expansion in the number of different items needing to be transported by a vehicle. As a result, the demand for carriers to transport items of varying dimensions and designs on cars and other vehicles also has grown significantly, and along with it the number and types of cargo-specific rack accessories that must be attached securely to a vehicle rack.

SUMMARY

In a first example, a clamping device for use on a crossbar of a vehicle rack may have a body including a docking surface with a docking interface for connecting the body to a cargo-specific rack accessory, and a mounting surface configured to contact an outer surface of a crossbar. The mounting surface may be spaced from and opposite the docking surface. A clamping assembly may be operatively connected to the body. The clamping assembly may include an actuator and a cleat operatively connected to the actuator. The cleat may have an elongate stem passing through and depending from the mounting surface, and an enlarged head portion at a distal end of the stem. The stem may have a longitudinal axis, and the clamping assembly may be configured such that moving the actuator between a first position and a second position causes the cleat to translate along the stem axis.

In a second example, a clamping device for use on a crossbar of a vehicle rack may have a body including a docking surface having a docking interface for connecting the body to a cargo-specific rack accessory, and a mounting surface configured to contact an outer surface of a crossbar. The mounting surface may be spaced from and opposite the docking surface. A clamping assembly may be operatively connected to the body. The clamping assembly may include an actuator and a cleat operatively connected to the actuator. The cleat may have an elongate stem passing through and depending from the mounting surface, a first arm, and a second arm, each arm extending generally orthogonally from opposite sides of the stem and forming the general shape of an inverted "T." The stem may have a longitudinal axis, and the clamping assembly may be configured such that moving the actuator between a first position and a second position causes the cleat simultaneously to rotate on the stem axis and to translate along the stem axis.

In a third example, a rack system for mounting on a vehicle having an elongate axis parallel to the direction of vehicular travel may include a crossbar and a pair of towers configured to mount the crossbar on top of a vehicle. The crossbar may be substantially perpendicular to the elongate axis and may include an upper surface having formed therein a lengthwise slot having a first lip and a second lip spaced from the first lip at a generally continuous distance defined as a slot width. A docking device may be mounted on the crossbar, the docking device including a body having a docking surface oriented generally upward and a mounting surface conforming to the upper surface of the crossbar. Two clamping assemblies may be spaced from each other along the crossbar, each clamping assembly including an actuator operatively connected to a cleat, the cleat passing through the mounting surface and into the slot in the crossbar. Each clamping assembly may be configured to interface with the slot in the crossbar such that moving the respective actuator from a first position to a second position may cause the respective cleat to rotate and translate into a clamping position clamping a portion of the crossbar between the cleat and the mounting surface of the device. Moving the respective actuator from the second position to the first position may cause the respective cleat to rotate and translate into an unclamped position, allowing the respective cleat to pass through the slot without interference.

In a fourth example, a rack system for mounting on a vehicle having an elongate axis parallel to the direction of vehicular travel may include a crossbar and a pair of towers configured to mount the crossbar on top of a vehicle. The crossbar may be substantially perpendicular to the elongate axis and including an upper surface having formed therein a lengthwise slot having a first lip and a second lip spaced from the first lip at a generally continuous distance defined as a slot width. A docking device may be mounted on the crossbar. The docking device may include a body, the body having a docking surface having a docking interface for connecting the body to a cargo-specific rack accessory and a mounting surface spaced from and opposite the docking surface and configured to contact the upper surface of the crossbar, and a clamping assembly operatively connected to the body, the clamping assembly including an actuator and a cleat operatively connected to the actuator. The cleat may have an elongate stem passing through and depending from the mounting surface, a first arm, and a second arm, each arm extending generally orthogonally from opposite sides of the stem and forming the general shape of an inverted "T." The stem may have a longitudinal axis, and the clamping assembly is configured such that moving the actuator between a first position and a second position causes the cleat simultaneously to rotate on the stem axis and to translate along the stem axis.

BRIEF DESCRIPTION OF THE DRAWINGS

FIG. 2 is a schematic block diagram of an illustrative docking system for attaching a cargo-specific rack accessory to a slotted crossbar.

FIG. 3 is an isometric view of an illustrative retention dock device.

FIG. 5 is an isometric view of the retention dock device of FIG. 3 with a cut-away portion of a cargo-specific rack accessory mounted to the top of the dock device.

FIG. 7 is an isometric view of an illustrative cam follower of the device shown in FIG. 5.

DETAILED DESCRIPTION

The present disclosure provides a retention dock device for attaching a cargo-specific accessory to a crossbar. The retention dock device includes at least one actuator operatively connected to a clamping assembly. The clamping assembly may be configured to clamp onto a slotted crossbar using a shaped cleat that is moved between clamped and unclamped positions by the actuator. The shaped cleat may clamp onto the slot by drawing an enlarged portion up under the lips of the slot in the crossbar to pinch the crossbar wall between the cleat and the body of the device. The actuator may be directly attached to the cleat, or may be connected to the cleat through one or more intermediate components such as a cam follower. In some examples, the actuator may include a rotatable knob. In other examples, the actuator may include a lever arm rotatable about a lever arm axis. The lever arm axis may be oriented parallel or perpendicular to the axis of the cleat.

Figure 1:
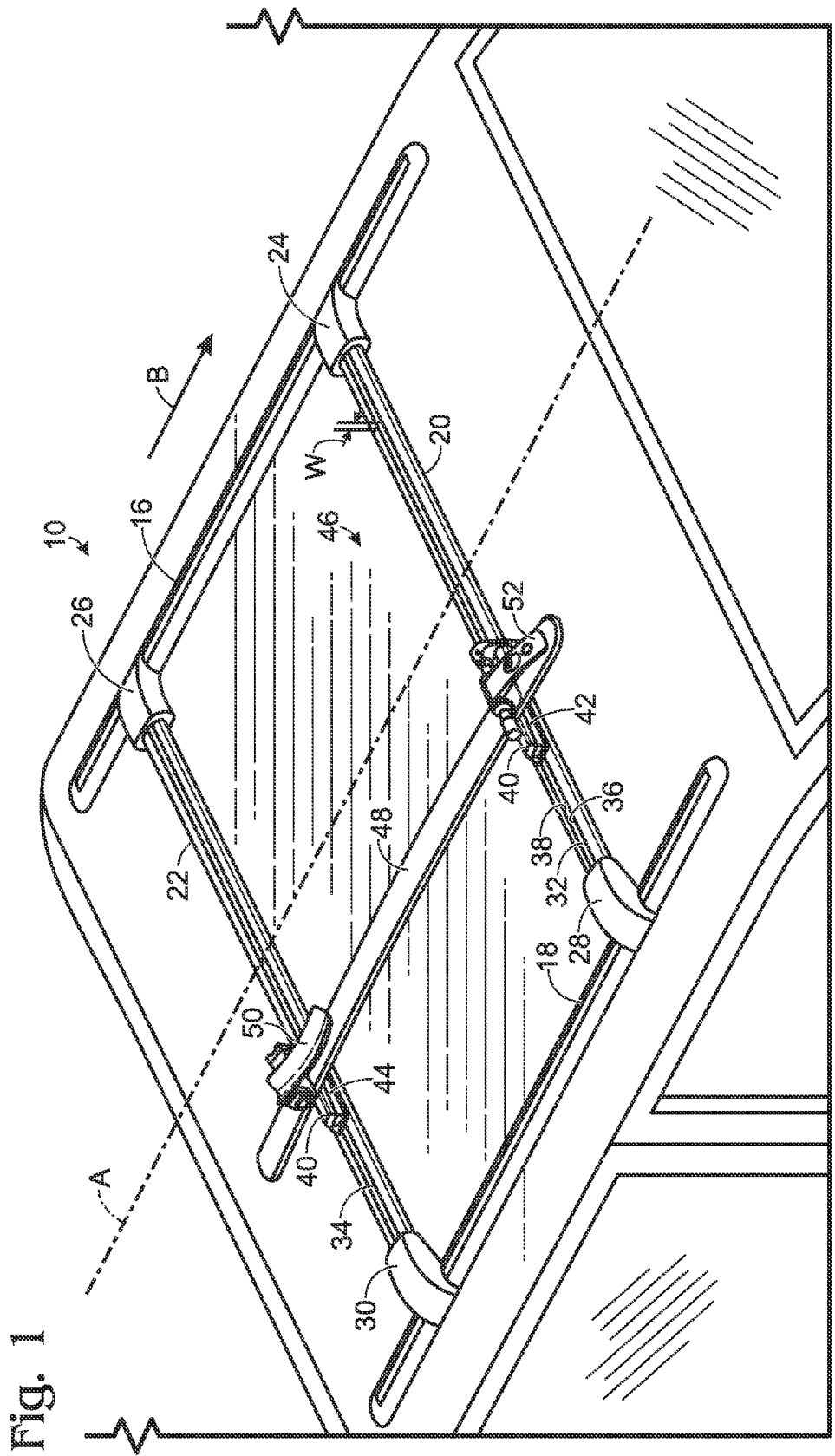
FIG. 1 shows a vehicle with an illustrative rack system and a cargo-specific rack accessory mounted to the rack using a docking system according to the present disclosure.

Turning to FIG. 1, an illustrative retention dock system is generally indicated at 10 and is shown mounted to a vehicle 12 having an elongate axis A and a direction of travel B. Retention dock system 10 includes a rack 14 having a pair of rails 16 and 18 mounted to vehicle 12, with two crossbars 20 and 22 oriented perpendicular to axis A and attached to the rails by feet or towers 24, 26, 28, and 30. Crossbars 20 and/or 22 may be movable along rails 16 and 18 in order to adjust the spacing between the two crossbars. Each crossbar includes a lengthwise slot, indicated at 32 and 34. As shown regarding slot 32, each slot has opposing lips 36 and 38 spaced apart at a generally continuous distance defined as the slot width W. A retention dock device 40 is mounted to each crossbar, with two examples of device 40 shown here as front retention dock device 42 and rear retention dock device 44. Finally, a cargo-specific rack accessory 46 is attached to an upper portion of each of the retention dock devices. As shown in FIG. 1, accessory 46 may include a fork-mounted bicycle carrier having an elongate tray 48, a wheel retention portion 50, and a fork retention portion 52. However, accessory 46 could include any of a number of cargo-specific accessories, such as boat carriers, upright bicycle carriers, ski racks, and the like.

FIG. 2 is a schematic block diagram of a retention dock system 60 according to the present disclosure, of which system 10 may be one example. As depicted in FIG. 2, system 60 includes a retention dock device 62, also referred to herein as a "clamping device" or "docking device," for connecting a cargo-specific rack accessory 64 to a slotted crossbar 66. As described above, accessory 64 may include any suitable accessory configured to mount on a vehicle rack. Retention dock device 62 includes a body portion 68 having an actuator 70 that is operatively connected to a clamping cleat 72. Body portion 68 may include any suitable structure configured to facilitate attachment of accessory 64 thereon, and to provide physical support for attaching actuator 70 and cleat 72. For example, body portion 68 may include an elongate structure having a docking surface and docking interface for attaching an accessory, and a mounting surface for contacting the crossbar opposite and spaced from the docking surface, with suitable attachment structures for the actuator and clamping cleat. The docking interface may include one or more mounting structures such as threaded holes, threaded bolts, mounting apertures, slots, latches, clamps, and the like. In some examples, docking device 62 may be incorporated into accessory 64 such that the docking interface is unnecessary.

Actuator 70 may be any suitable structure or device configured to be manipulated by hand and moved from a first position to a second position. For example, actuator 70 may include a rotatable knob, a lever arm, and/or a pushbutton. Actuator 70 may be operatively attached to clamping cleat 72, and moving the actuator between the first position and the second position may cause the clamping cleat to move between clamped and unclamped positions. Clamping cleat 72 may include any suitable structure or device configured to interface with the slot of crossbar 66 to selectively clamp or unclamp the body of device 62 to the crossbar. For example, cleat 72 may include a shaped cleat configured to fit within the slot and to hold the lips of the slot between the cleat and the mounting surface of body 68.

In some examples, cleat 72 may be configured to be slid into the slot from an opening at the end of the crossbar, with a portion of the cleat remaining under the lips of the slot. In these examples, a portion of the cleat may be larger than the slot width in all dimensions. For example, the cleat may be shaped as an inverted mushroom, with an enlarged head portion that is slid into the through an end of the crossbar while a stem portion passes through the slot and allows continued connection to the clamping assembly. When repositioned, the actuator may then pull up on the stem portion to draw the head portion up under the lips of the slot, thereby clamping the body to the crossbar. Examples of systems including end-access to a slot in the crossbar are described in U.S. Pat. No. 8,333,311, the entirety of which is incorporated herein by reference for all purposes.

In other examples, cleat 72 may be passed into the slot through the slot width rather than at an end opening, and then repositioned to allow clamping. In these examples, the cleat may be larger than the slot width in one dimension, and narrower than the slot width in another, allowing selective clamping based on the orientation of the cleat. For example, the cleat may be shaped generally in the form of an inverted "T," allowing the cleat to be passed into the slot at any point along the crossbar and then repositioned 90 degrees to prevent removal and allow clamping similar to the method described above regarding the mushroom-type cleat. The T-shaped example is described in more detail below.

Figure 4:
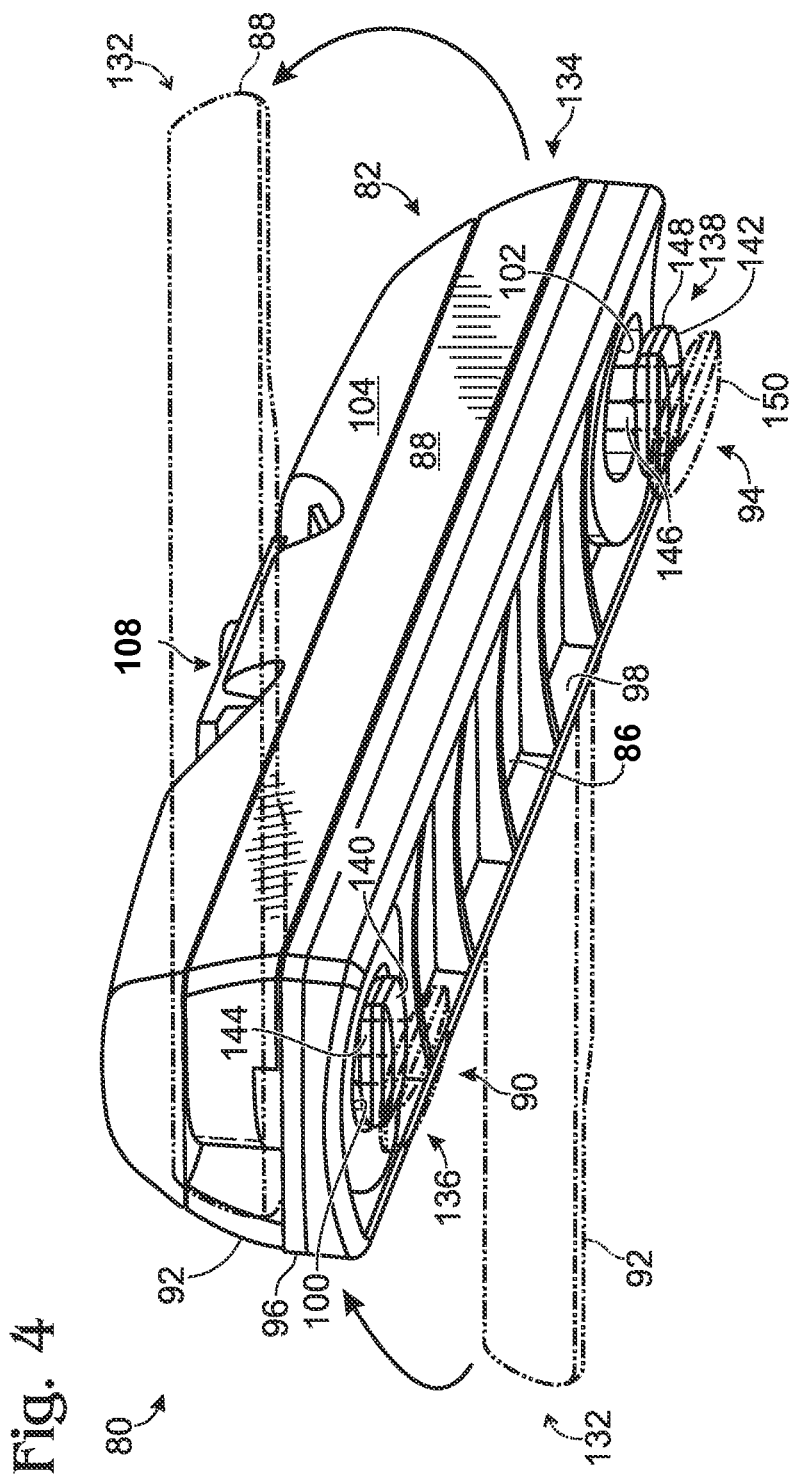
FIG. 4 is an isometric view of the device of FIG. 3 showing operating levers in two positions.

FIGS. 3 and 4 show an example of a docking device 80, with FIG. 3 showing an isometric view from above device 80, and FIG. 4 showing an isometric view from below device 80. In the example shown, docking device 80 includes an elongate body 82 having a docking interface 84 on an upper face and a mounting surface 86 on a lower face, a first actuator in the form of a lever arm 88 on one side of the body and operatively attached to a first clamping assembly 90, and a second actuator on the opposite side of the body in the form of a lever arm 92 operatively attached to a second clamping assembly 94.

Body 82 includes an elongate base plate 96, which is substantially planar, and on which are formed various internal structures as further explained below regarding FIG. 5. Body 82 also includes a mounting pad 98, which attaches to the bottom surface of plate 96 and has a lower surface conforming to the shape of an expected crossbar surface, thereby forming mounting surface 86.

Pad 98 includes apertures 100 and 102, which are holes in pad 98 suitably sized and shaped to allow portions of clamping assemblies 90 and 94 to pass through the pad unhindered. Pad 98 may be constructed of a resilient material in order to absorb mechanical shocks and to facilitate clamping. In the example shown in FIG. 4, mounting surface 86 is ribbed. In some examples, pad 98 may instead form a continuous and smooth mounting surface 86.

Body 82 may also include an upper cover 104 attached to plate 96 through internal structures. Cover 104 may be constructed of a rigid or semi-rigid material, and is configured to encase a portion of the upper face of body 82 in order to provide an aerodynamic shape, protection from the environment, and general aesthetic streamlining of the device. Cover 104 includes an opening 106 to allow docking interface 84 to remain exposed and accessible for attachment of accessories.

Docking interface 84, as shown in the example of FIGS. 3 and 4, includes several features configured to facilitate attachment of an accessory to the top of docking device 80. Generally speaking, docking interfaces may have at least two configurations. Docking device 80 includes an adjustable docking interface, while other examples described below have a fixed docking interface (see FIGS. 5-8). In this context, an "adjustable" interface means that an attached accessory may be repositioned with respect to the docking device (while remaining attached), and a "fixed" interface means that an attached accessory is not substantially repositionable with respect to the docking device. Referring back to FIG. 1, docking devices 40 may each have either configuration. For example, docking device 42 may have a fixed interface, and docking device 44 may have an adjustable interface, in order to facilitate adjustment of the spacing between devices 40 to match the spacing between crossbars 20 and 22.

Docking interface 84 includes a substantially planar upper surface 108 having a plurality of openings formed therein, and lateral flanges 110 and 112 respectively overhanging recesses 114 and 116 formed in the upper surface of body 82. Surface 108 forms a support surface for a docked or attached accessory. Apertures or openings formed in the surface may perform various functions. In the example shown, two openings indicated at 118 and 120 house spring-biased detent mechanisms for lever arms 88 and 92 (described in more detail below). The other two openings indicated at 122 and 124 house spacers (not shown) configured to prevent noise or rattling. In the fixed type of interface, openings 122 and 124 are used as through-holes for connectors such as threaded bolts, as described more fully below. However, because interface 84 is the adjustable type, attachment bolts for an accessory are inapplicable to this embodiment.

FIG. 5 shows a mountable portion 126 of an accessory attached to docking interface 84 and illustrates the adjustable nature of this type of interface. As depicted, a lower section of mountable portion 126 may include a recess having a generally T-shaped cross section, with extensions 128 and 130 configured to hook under lateral flanges 110 and 112. Accordingly, mountable portion 126 is supported by docking interface 84 and may slide along device 80 while extensions 128 and 130 remain hooked under flanges 110 and 112, thereby repositioning the docking device relative to the accessory.

Returning to FIGS. 3 and 4, lever arm actuators 88 and 92 are rigid lever arms each rotatable about a respective lever arm axis, as shown in FIG. 4. In the example shown, each lever arm also acts as a side wall for device 80 when in a position parallel to and against body 82. As will be explained in further detail below, lever arm actuators 88 and 92 are configured to remain continuously in a single plane of rotation as they pivot between an open position 132 and a closed position 134. In the example shown, open position 132 and closed position 134 are approximately 90 degrees apart.

Clamping assemblies 90 and 94 each include a shaped cleat indicated at 136 and 138 passing through and depending from mounting surface 86. Each cleat includes a respective enlarged head portion 140, 142 and a stem portion 144, 146. Each head portion may include two arms protruding orthogonally on opposite sides of the stem, forming the inverted T shape described above. Each stem is operatively connected to a respective lever arm such that pivoting the lever arm between the opened and closed positions causes the cleat to rotate 90 degrees around a long central axis of the stem, and also causes the cleat to translate a predetermined distance along the long axis of the stem. This simultaneous rotation and translation is shown in FIG. 4, with the cleats in a clamped position 148 when the lever arms are in closed position 134 and in an unclamped position 150 when the lever arms are in open position 132.

Figure 11:
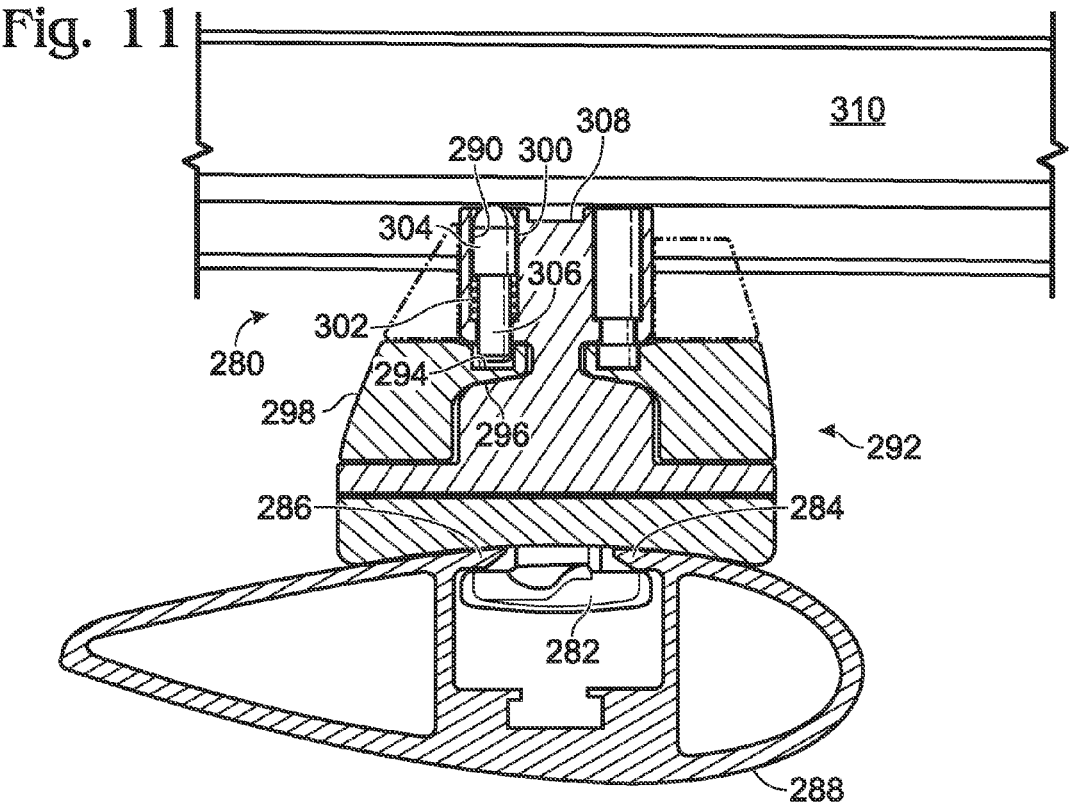
FIG. 11 is a sectional side view of an illustrative docking clamp device mounted on a crossbar and having a component attached to an upper surface, showing a locking pin in locked position.

Operation of a clamping assembly may be generally described beginning with the docking device clamped to a crossbar with the long head of the T-shaped cleat oriented across and pulled up under the slot in the crossbar. For illustration, an example of this arrangement is shown in FIG. 11. Pivoting or rotating the lever arm away from the body of the device by 90 degrees causes the associated cleat to rotate and place a long axis of the head of the cleat into alignment with a long axis of the slot. This orientation allows the head to pass unimpeded through the mouth or opening of the slot. Pivoting the lever arm in this manner also causes the head of the cleat to move away from the mounting surface of the body. The net effect of this rotation and translation is to disengage the cleat from the crossbar, because the lips of the crossbar slot will no longer be clamped between the mounting surface of the body and the head of the cleat. Conversely, pivoting the lever arm closed, or 90 degrees back toward the body of the device may result in clamping of the lips of the slot by the cleat. As the lever arm pivots, the head moves toward the mounting surface and rotates to place the long axis of the T-shaped head ninety degrees out of alignment with the opening of the slot, pinching the lips of the slot between the cleat and the mounting surface. One having skill in the art will recognize that a single clamping assembly may therefore clamp a device to a crossbar. However, including two or more spaced-apart clamping assemblies will provide added stability and clamping power, and will prevent forcible twisting of the entire device in order to reorient the head of a single clamped cleat.

Figure 6:
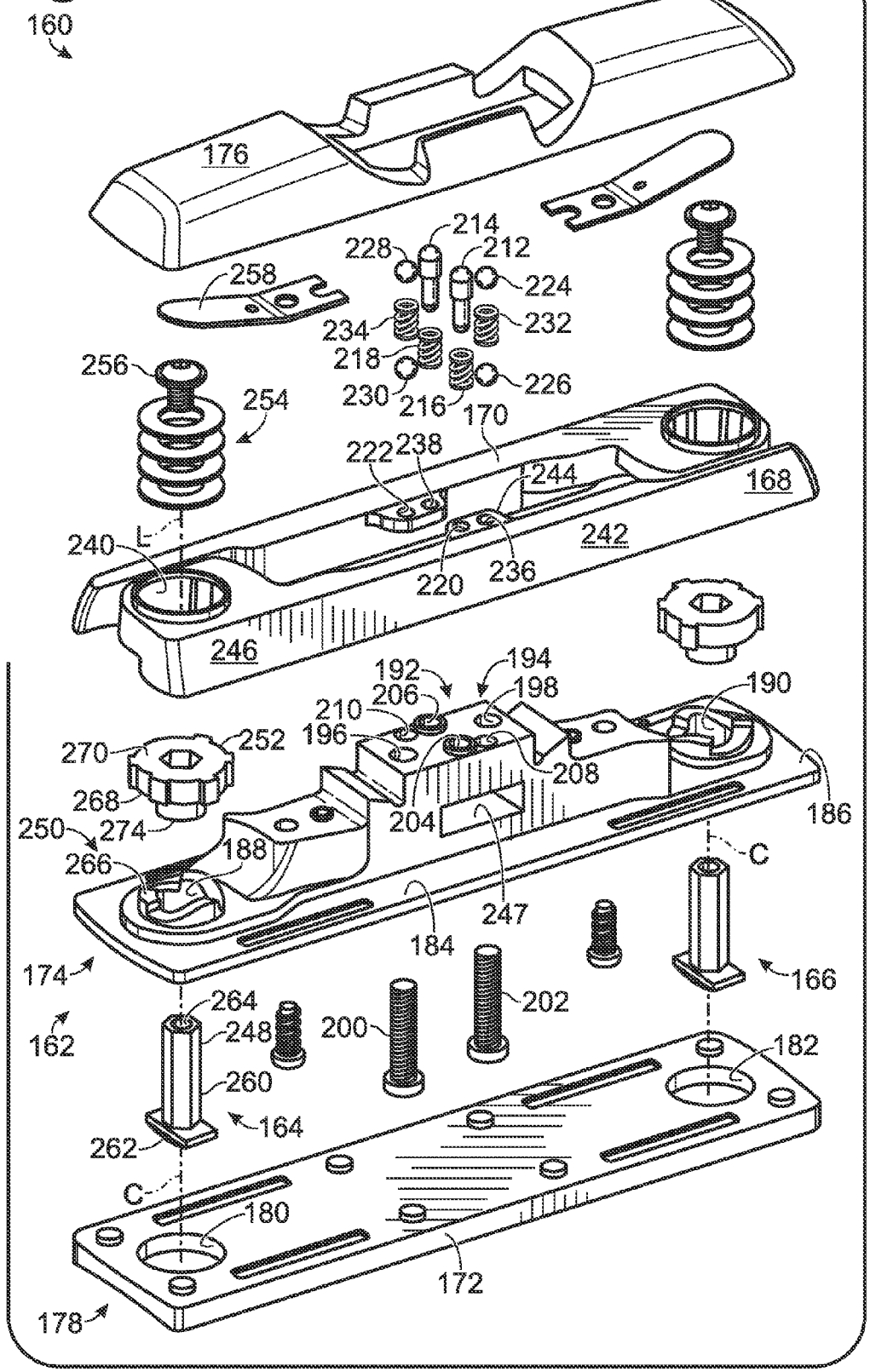
FIG. 6 is an exploded isometric view of another illustrative docking device.
Figure 8:
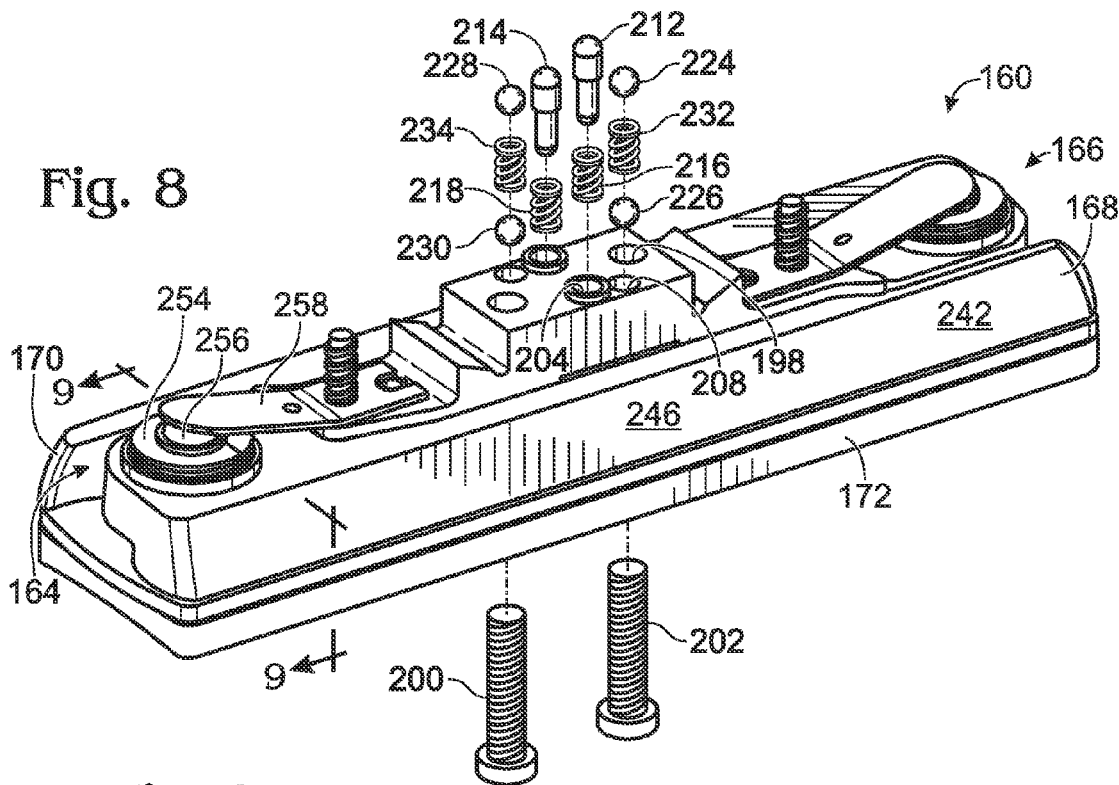
FIG. 8 is a partially-exploded isometric view of the retention dock device of FIG. 5 with an upper cover removed.
Figure 9:
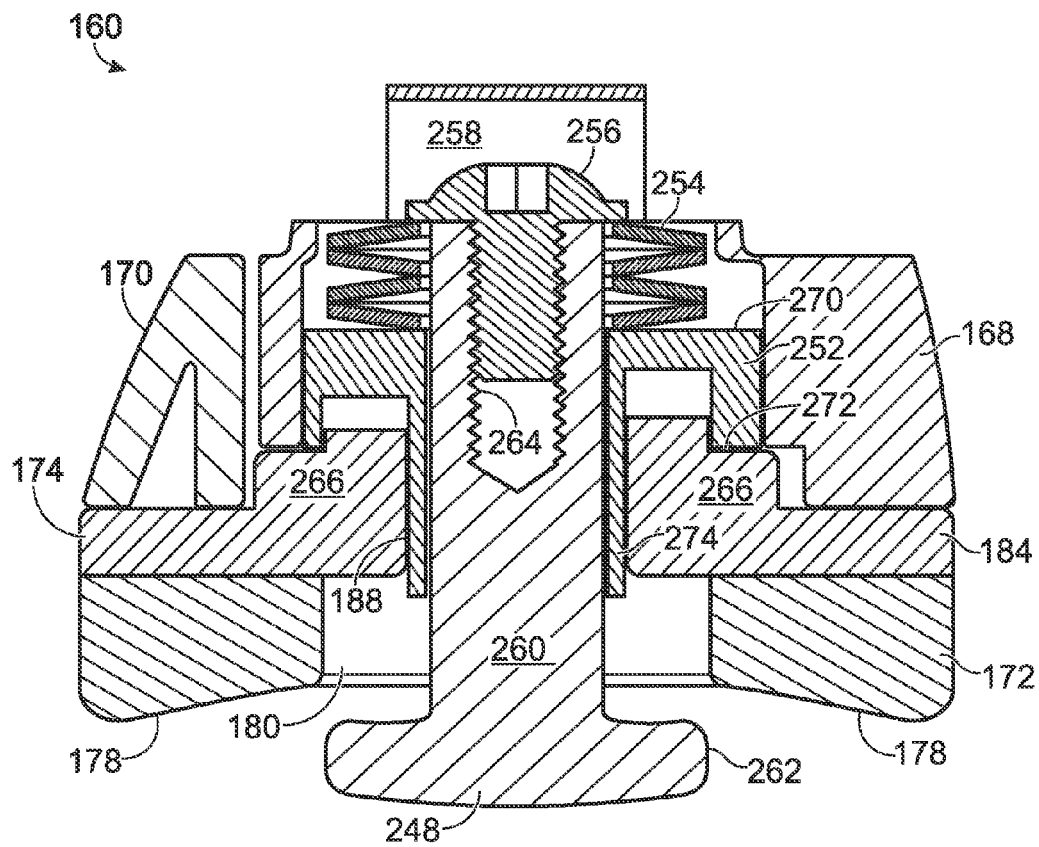
FIG. 9 is a sectional side view of the docking clamp device of FIG. 5 with an upper cover removed.
Figure 10:
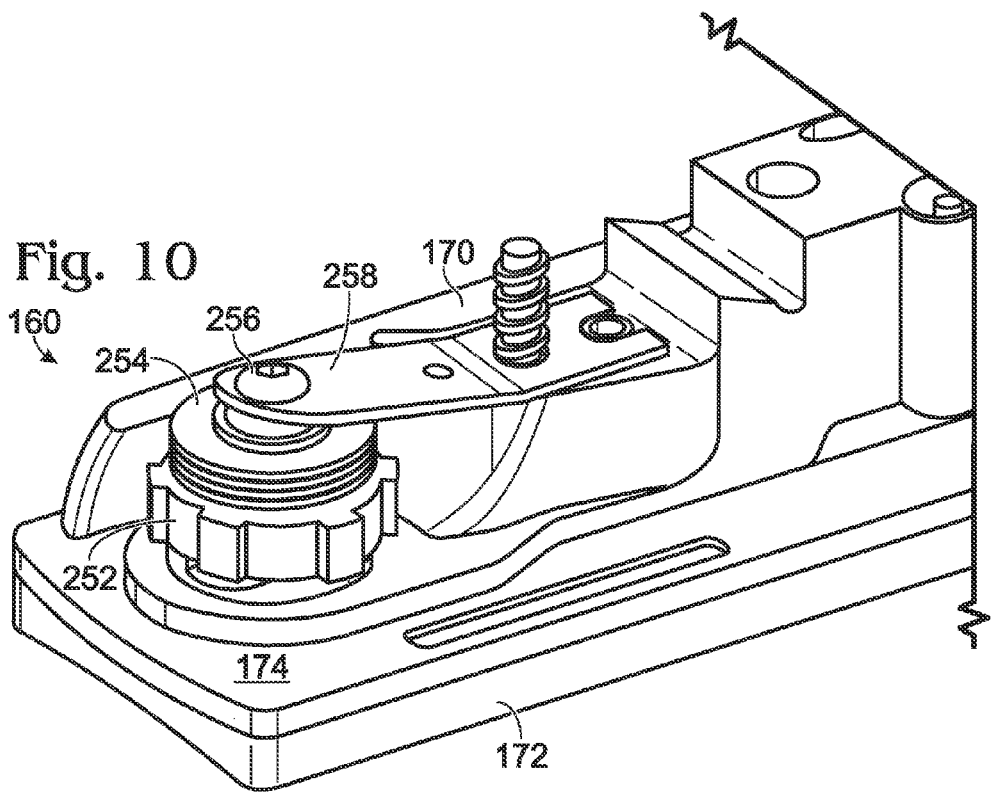
FIG. 10 is a partial isometric view of the retention dock device of FIG. 3 with an upper cover and operating lever removed.

Turning to the exploded view of FIG. 6, and the partially exploded view of FIG. 8 and with reference as well to FIGS. 7, 9, and 10, a retention docking device is generally indicated at 160. Docking device 160 is substantially identical to docking device 80, with the exception of having a fixed type docking interface, as will be explained further below.

Docking device 160 includes a body 162 and two clamping assemblies 164 and 166 with associated lever arm actuators 168 and 170. For convenience, lever arm 168 and clamping assembly 164 will be described in detail, with the understanding that lever arm 170 and clamping assembly 166 are substantially identical and are merely reversed and spaced from their counterparts.

Body 162 includes a mounting pad 172, a base 174, and an upper cover 176. Mounting pad 172 may be any suitable structure configured to provide a resilient and secure interface between the rigid base plate and a crossbar on which the device is mounted. Accordingly, a lower mounting surface 178 of mounting pad 172 may be curved or otherwise shaped to conform to an upper surface of an expected crossbar, as shown in FIG. 6. Mounting pad 172 includes two apertures 180 and 182, each sized to allow free passage of a cleat associated with clamping assemblies 164 and 166, respectively, as well as various other through-holes for fasteners and the like.

Base 174 is attached to mounting pad 172, and may be any suitable structure configured to provide various mounting points, apertures, and control surfaces for attaching the remaining components of docking device 160. Base 174 includes a base plate 184 having an outer flange 186 that may be friction fit to mounting pad 172. Base 174 includes two apertures 188 and 190 formed in base plate 184 for attaching clamping assemblies 164 and 166, respectively. The apertures are disposed on either side of a central block structure or pedestal 192, and pedestal 192 includes a central upper docking interface 194 for attaching accessories.

As described above, docking interface 194 is of the fixed type, and includes through-holes 196 and 198 configured to allow threaded fasteners 200 and 202, respectively, to pass upward through the base to allow attachment of an accessory, as best shown in FIG. 7. Unlike adjustable interface 84, interface 194 does not have lateral flanges. Interface 194 does include two other pairs of holes, however, namely a pair of locking pin holes 204 and 206, and a pair of detent mechanism holes 208 and 210.

Locking pin holes 204 and 206 are cylindrical apertures passing through base 174, and are each configured to house a locking pin (212 and 214) and a biasing mechanism such as a spring (216 and 218). The locking pin and spring arrangement are configured to enable selective locking of the lever arms of docking device 160. Each locking pin hole and associated locking pin is shaped to enable the spring to bias the pin in an upward direction. Each pin is configured to fit into a corresponding locking recess (220 and 222) in one of the lever arms, as indicated in FIG. 6, thereby preventing the lever arm from being repositioned. Because the locking pins are biased upward, away from the recess in the lever arm, an outside force or component must urge the pins downward in order to lock the lever arms. To facilitate this, each locking pin is sized such that an upper end of the pin protrudes above docking interface 194 and a lower end of the pin remains above the lever arm recess when in the unlocked, biased position. Further description of the locking mechanism may be found below. In other examples, the locking pins may be unbiased. In other examples, such as in the case of an adjustable interface docking device, the locking pin holes may instead house detent mechanisms as described regarding holes 208 and 210 below.

Detent mechanism holes 208 and 210 are also cylindrical apertures passing through base 74, and are each configured to house a biased detent mechanism such as the ball and spring arrangement shown in FIGS. 6 and 7. In the example depicted, each detent mechanism includes two balls (224 and 226, 228 and 230) separated vertically by a spring (232 and 234). The detent mechanisms are configured to resist opening of the lever arms once they are in a closed position. Accordingly, lower balls 226 and 230 are sized and positioned to fit partially into a corresponding detent recess (236 and 238) in one of the lever arms. A component attached to docking interface 194 may provide a downward force on the mechanism. In other examples, each detent mechanism may be trapped within the hole, with the lower ball protruding as needed to implement the detent feature. In some examples, the locking recesses 220 and 222 are substantially identical to the detent recesses 236 and 238, enabling interchangeable purposing of the locking and detent mechanism holes. For example, if one of the features is not desired, one pair of holes may be eliminated and the other pair of holes may be utilized for the desired purpose, i.e., either as locking holes or as detent mechanism holes.

Upper cover 176 may be any suitable upper rigid casing or cap configured to cover at least part of base 174 and to provide protection for internal components as well as to provide aesthetic appeal and improved aerodynamics.

Turning to the clamping assemblies and associated lever arms, one side will be described as stated above, with the understanding that the other side is substantially identical. Each clamping assembly includes components configured to convert the quarter-turn rotation of a lever arm into simultaneous axial rotation and axial translation of a cleat.

Lever arm 168 may include any suitable elongated handle pivotable at one end and attachable to the cleat assembly such that pivoting the lever also rotates the cleat. In the example depicted in the drawings, lever arm 168 includes a keyed mounting aperture 240 at a proximal end of an elongate arm 242, and a tab 244 protruding from one side of the arm.

Keyed mounting aperture 240 is an aperture in a proximal end of lever arm 168, with an inner perimeter shaped to provide a friction fit with a gear-like outer perimeter of a cam follower described below. Other mounting methods may be possible, such as bolting, adhering, or otherwise affixing the operating lever to the cam follower. However, as will be explained, a splined or keyed connection provides certain benefits by maintaining more than one degree of freedom for the components involved. A central axis of the aperture will function as the lever arm axis, indicated at L, about which the lever arm is rotatable.

Arm 242 may be any suitable handle configured to facilitate user manipulation. In this example, arm 242 is substantially the same length as base 174, and an outer surface 246 of the arm forms a portion of the outer surface of docking device 160. Tab 244 protrudes from an inner surface of arm 242, and provides an interface for the detent mechanism and/or locking pins to keep the lever arm in position adjacent to body 162. Specifically, an upper surface of tab 244 includes the previously described recesses 220 and 236. Tab 244 fits into a corresponding aperture or recess 247 in base 174 when lever arm 168 is pivoted fully against the base.

With continuing reference to FIG. 6, and as additionally shown at least partially in FIGS. 7-10, clamping assembly 164 includes a cleat 248, a cam structure 250 and a corresponding cam follower 252, a biasing assembly 254 attached to the cleat with mounting hardware 256, and a biasing member 258 configured to bias the whole assembly downward.

Cleat 248 may be any rigid member having a shaft with an enlarged head portion at a distal end, configured to pass through the opening of an expected slot in a crossbar in a first orientation and to be unable to pass through the opening in an orientation 90-degrees from the first orientation. For example, a cleat may have a "J" or an "L" or an inverted "T" shape. In the example depicted in the drawings, cleat 248 has an inverted "T" shape, with a hexagonal-cross-section shaft or stem 260 having a stem axis indicated at C and an enlarged head 262 having opposing arms that extend outward on each side of stem 260 at a distal end. Stem 260 includes a threaded axial hole 264 formed in a proximal end for receiving mounting hardware 256.

Cam structure 250 may be any suitable structure configured to cause axial movement of a cam follower as the cam follower is rotated on the cam surface of the structure. In the example depicted in the drawings, cam structure 250 includes a circular raised cam surface 266 on base plate 184 surrounding aperture 188. Cam surface 266 has four curved portions, each covering 90 degrees of the circumference. Each portion curves normally away from the base flange over the 90 degrees.

Cam follower 252 may be any suitable structure configured to facilitate pivotal coupling between the operating lever and the cleat, and to also provide a cam follower surface for producing axial translation that may be transferred to the cleat. In the example depicted in the drawings, cam follower 252 includes a roughly cylindrical upper portion 268 having a keyed or gear-like perimeter for mating in a friction fit with correspondingly shaped aperture 240 in the lever arm. The cam follower and lever arm are configured to be connectable by at least one radial key mated to a grooved keyway. This arrangement causes the cam follower to maintain angular correspondence with the lever arm as it is rotated, but allows the cam follower to remain movable in a direction along lever arm axis L. In some examples, the key structures are on the lever arm and the associated grooved keyways are on the cam follower. Cam follower 252 also includes a hexagonal central aperture 264 for receiving cleat stem 260, providing a similar connection as between the cam follower and the lever arm, i.e., pivotal coupling with axial freedom.

Upper portion 268 includes a flat upper surface 270 and an undulating lower cam follower surface 272 for interfacing with the raised cam surface 266, as best shown in FIG. 8. Cam follower 252 also includes a sleeve portion 274 protruding downward from upper portion 268 and sized to fit snugly within aperture 188 when cam follower surface 272 is in contact with raised cam surface 266. "Downward" is used in this context as away from cover 176 and toward mounting pad 172. Sleeve portion 274 of cam follower 252 is inserted into aperture 188, and sized to allow some axial motion of the cam follower. As should be understood from the previous description, rotation of cam follower 252 within aperture 188 will cause the cam follower to move axially in and out of the aperture due to the interaction of the cam and cam follower surfaces.

Together, biasing assembly 254 and mounting hardware 256 provide a flexible axial coupling between cleat 248 and cam follower 252. Biasing assembly 254 may include any suitable spring-like structure configured to provide a flexible interface between mounting hardware 256 and upper flat surface 270 of cam follower 252. Mounting hardware 256 may include any suitable mechanical connector for connecting cleat stem 260 to biasing assembly 254. In the example shown in the drawings, mounting hardware 256 is a bolt or screw inserted into threaded hole 264 in cleat stem 260. In this example, biasing assembly 254 is a series of four Belleville washers, arranged in alternating fashion to form a spring between the head or flange of mounting hardware 256 and flat top surface 270 of the cam follower. Cleat 248 is attached to cam follower 252 and will rotate with the cam follower because the hexagonal shaft of the cleat is confined within the hexagonal aperture in the cam follower. However, cleat 248 maintains a degree of axial freedom due to the nature of the attachment, and can slide up and down within the cam follower against the spring force of the washer stack. This allows, for example, a softening or cushioned clamping of the lips of a crossbar slot, and compensates for variations in the expected thickness of a wall of the crossbar.

Biasing member 258 may be any suitable structure configured to bias cleat 248, and the clamping assembly in general, downward with respect to the base without restricting axial rotation. In the example shown, biasing member 258 is a leaf spring or other spring-like strip of metal secured to base 174 at a proximal end and resting atop mounting hardware 256 at a distal end. In other examples, such as the one depicted in FIG. 10, the distal end of biasing member 258 may instead be secured under the head of mounting hardware 256. Biasing member 258 functions to ensure cleat 248 is not easily pushed upward, for example when inserting the cleat into the slot of the crossbar. Crossbars with slots may include a resilient in-fill in the slot, which must be overcome in order to insert anything into the slot. Biasing member 258 is configured to allow the cleat to overcome such a resistance.

Figure 12:
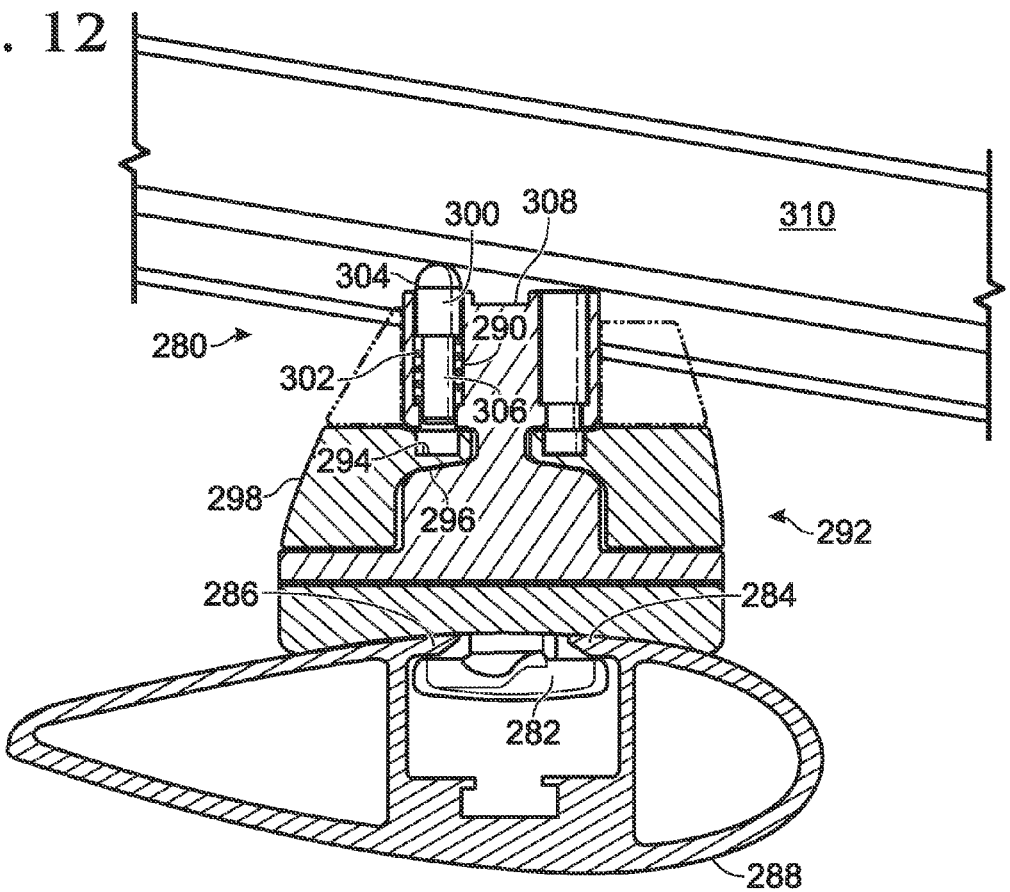
FIG. 12 is a sectional side view of the docking clamp device of FIG. 12 showing a locking pin in unlocked position.

FIGS. 11 and 12 are sectional views of an illustrative locking pin mechanism 280 for use in a docking device according to the present disclosure. Additionally, FIGS. 11 and 12 provide a sectional view of a cleat 282 clamped onto lips 284 and 286 of a slot in a slotted crossbar 288, as described above. As also described above, a through-hole 290 may be formed in the upper mounting interface of the central block structure of a docking device 292, passing through the central pedestal of the base and aligning with a recess 294 in a tab 296 of a lever arm 298 when the lever is fully pivoted against the body of the dock. A shaped locking pin 300 biased by a spring 302 may be placed into the hole. An upper portion of the locking pin may protrude above the mounting surface due to spring biasing, and the locking pin may be sized such that applying downward force to overcome the biasing causes a lower portion to engage the recess in the tab of the lever arm, thereby preventing repositioning of the lever.

As depicted in FIGS. 11 and 12, locking pin 300 may be an elongated cylindrical member having an upper portion 304 with a rounded end and a larger diameter than a lower portion 306. A spring or other biasing device, such as spring 302, may be used to bias locking pin 300 in a position where the rounded head of upper portion 304 protrudes above a docking surface 308 of a docking device 292. In this position, a lower end of lower portion 306 may remain disengaged from recess 294, as shown in FIG. 12.

FIG. 11 shows an external accessory, in this case a bicycle carrier rail 310, attached to docking surface 308 and depressing locking pin 300 into recess 294. FIG. 12 illustrates that tilting the rail greater than approximately 15 degrees may allow locking pin 300 to disengage from recess 294 and thereby unlock lever 298. As a security measure, an end of rail 310 may be operatively locked to another crossbar, such that the end must be freed before the rail may be tilted as described. Any suitable structure may be used to provide locking force to pins such as locking pin 300. In some examples, rather than tilting an accessory, portions of other components such as fork attachments or other mounting devices may be utilized to interact with a locking pin or pins. In some examples, the portions used may be accessory locks themselves, thereby simultaneously locking the accessory to the docking device and the docking device to a crossbar.

Figure 13:
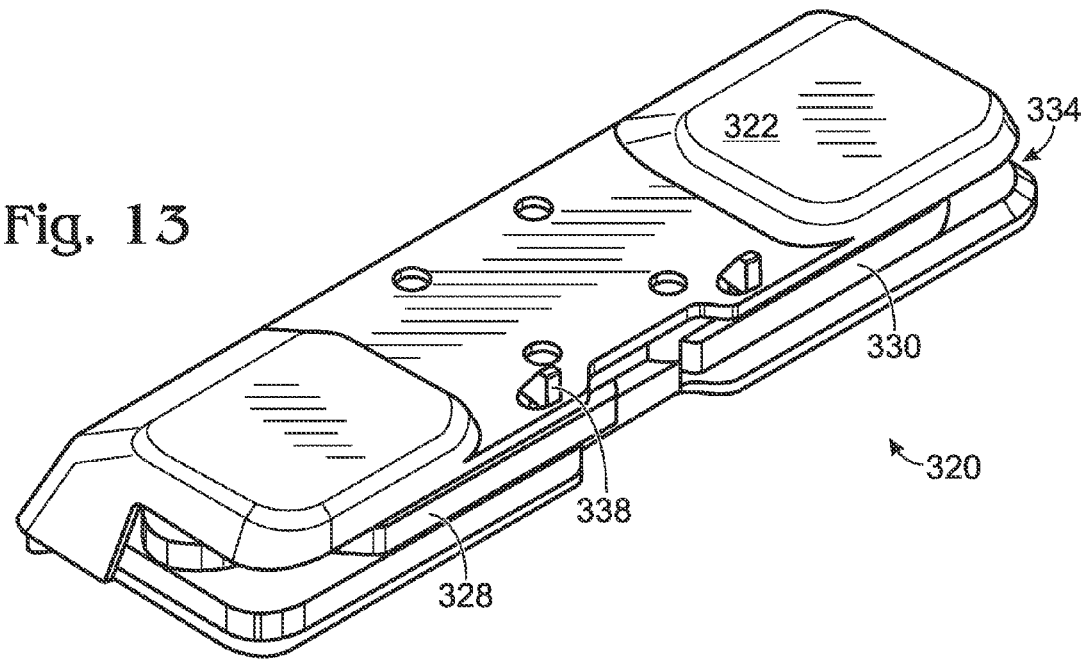
FIG. 13 is an isometric view of an illustrative docking clamp device having two operating levers on the same side.
Figure 14:
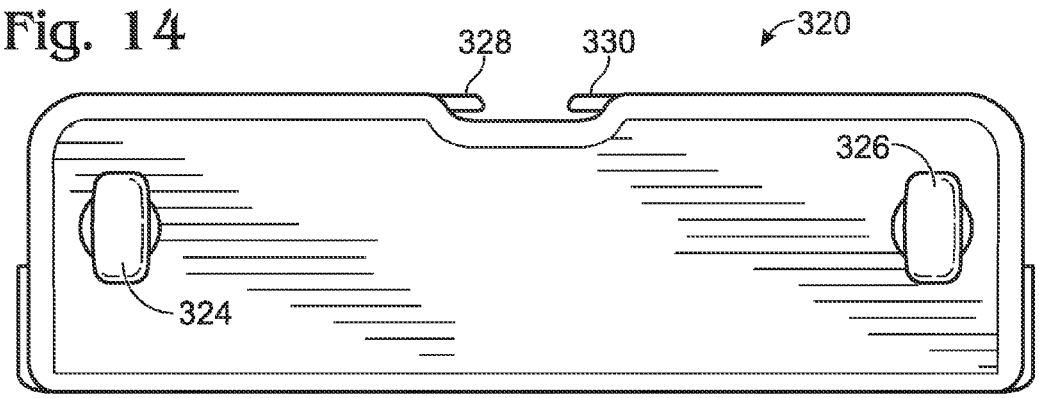
FIG. 14 is a bottom view of the docking clamp device of FIG. 13.
Figure 15:
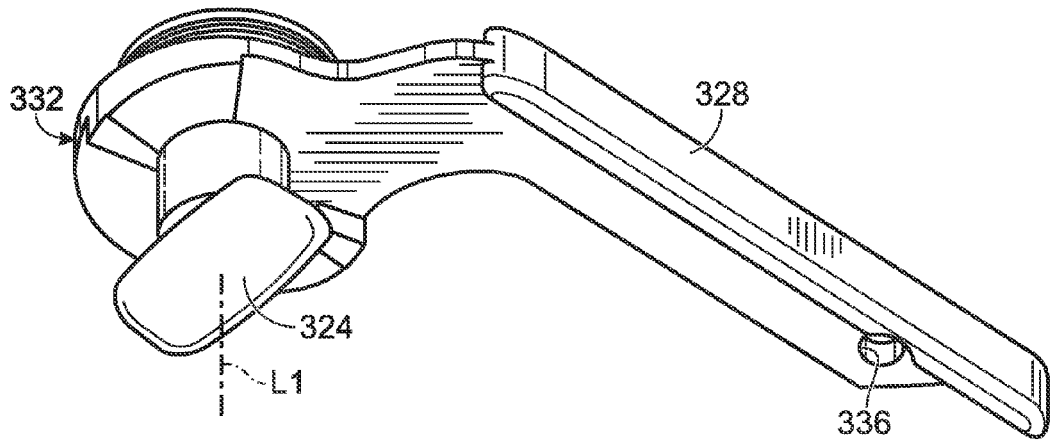
FIG. 15 is an isometric view of an illustrative one-piece operating lever and cam follower.

FIGS. 13-15 show another example of a docking device. Specifically, a docking device 320 is depicted in an orthogonal view in FIG. 13, and a bottom plan view in FIG. 14. Dock 320 may include a body 322, two cleated clamping assemblies 324 and 326, and two associated lever arms 328 and 330. Operation and description of docking device 320 is similar to operation and description of docking device 160. However, lever arms 328 and 330 of device 320 are notably disposed on the same side of the device rather than on opposing sides. This may facilitate access to both levers from one side, and may also reduce the relative size of each lever arm to allow both levers to fit side by side.

In this example, each operating lever is constructed as a unit with a respective cam follower, as indicated at 332 in FIG. 15, rather than the keyed two-piece construction of docking device 160. In this arrangement, it should be appreciated that the lever arm and cam follower are no longer axially independent. Accordingly, rotating lever arm 328 about a lever arm axis L1 would cause both cam follower 332 and lever arm 328 to translate along axis L1. For this reason, the width of a gap 334 in which the lever arms fit is larger than the width of a lever arm, to allow the arm to travel up and down as it is rotated.

In this example, lever arms 328 and 330 include a lock hole, indicated at 336 on lever arm 328, for locking the lever to body 322. A spring-biased locking pin 338 may be inserted into lock hole 336 by applying force to an upper portion of the pin, similar to the locking operation described above regarding locking pin 300.

Figure 16:
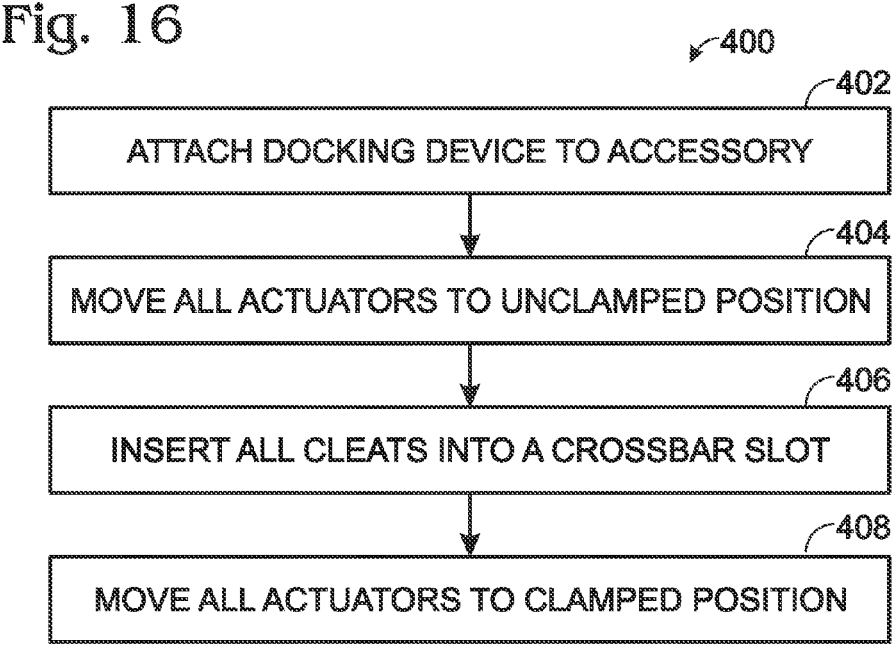
FIG. 16 is a flow chart illustrating a method for attaching a cargo-specific rack accessory to a slotted crossbar using a docking device according to the present disclosure.

FIG. 16 is a flow chart showing an illustrative method 400 for attaching a cargo-specific rack accessory to a slotted crossbar using a docking device according to the present disclosure. Step 402 of method 400 includes attaching a docking device to the accessory. For example, a device having a fixed docking interface may be used, in which case the accessory would typically be attached via the threaded bolts protruding from an upper face of the docking device. In other examples, a docking device having an adjustable docking interface may be used. In these examples, an opening or slot in the accessory may be slid onto the shaped upper portion of the docking device. Step 402 may also include attaching a second docking device to the accessory. Typically, but not always, at least one of the two docking devices will be of the fixed docking interface type.

Step 404 of method 400 includes moving all actuators to positions corresponding to "unclamped" on all docking devices attached in step 402. For example, this step may involve positioning the lever arm or arms to the open position for docking stations that have lever arms for actuators. This step may be done asynchronously, such as by opening the arms on one docking device, performing step 406, and then opening the arms on the other docking device before performing step 406 again. The effect of this step should be to place the clamping assembly or assemblies into a position allowing them to be inserted into the slot of the crossbar.

Step 406 of method 400 includes inserting the cleat or cleats of a docking device into the slot of the crossbar. As described above, this may include sliding each cleat into the slot from an end opening, in other words inserting the head portion of the cleat into the end of the slot and moving it in a longitudinal direction with respect to the slot. This insertion method would be appropriate for cleats with heads that are wider than the slot width in all lateral dimensions. In other examples, inserting a cleat may include passing the head portion of the cleat through the slot between opposing lips, essentially pushing the cleat into the opening orthogonally. This insertion method would be appropriate for cleats such as the T-shaped cleat described above, where the enlarged head portion is sized to fit into the slot opening when in an unclamped orientation. Step 406 may include removing or deforming a resilient infill disposed within the slot in order to allow insertion of the cleat or cleats. If multiple docking devices are used, the cleat or cleats of each docking device will be inserted into the crossbar associated with that docking device. This may include repositioning an adjustable docking device to align it with the proper crossbar.

Step 408 of method 400 includes moving all actuators to positions corresponding to "clamped" on all docking devices whose cleats were inserted in step 406. For example, this step may involve positioning the lever arm or arms to the closed position for docking stations that have lever arms for actuators. The effect of this step should be to clamp the docking device or devices onto the crossbar.

Based on the above description and the associated drawings, the following examples presented as numbered paragraphs describe various embodiments of apparatuses and methods of the disclosure.

A0. A clamping device for use on a crossbar of a vehicle rack, the device comprising: a body including a docking surface having a docking interface for connecting the body to a cargo-specific rack accessory, and a mounting surface configured to contact an outer surface of a crossbar, the mounting surface being spaced from and opposite the docking surface; a clamping assembly operatively connected to the body, the clamping assembly including an actuator and a cleat operatively connected to the actuator, the cleat having an elongate stem passing through and depending from the mounting surface, and an enlarged head portion at a distal end of the stem; wherein the stem has a longitudinal axis, and the clamping assembly is configured such that moving the actuator between a first position and a second position causes the cleat to translate along the stem axis.

A1. The device of paragraph A0, wherein the actuator comprises an elongate lever arm rotatable around a lever arm axis.

A2. The device of paragraph A1, wherein the lever arm is operatively connected to the cleat by a cam follower engaged on a cam surface, the cam follower configured to translate perpendicular to the lever arm axis when rotated by the lever arm.

B0. A clamping device for use on a crossbar of a vehicle rack, the device comprising: a body including a docking surface having a docking interface for connecting the body to a cargo-specific rack accessory, and a mounting surface configured to contact an outer surface of a crossbar, the mounting surface being spaced from and opposite the docking surface; a clamping assembly operatively connected to the body, the clamping assembly including an actuator and a cleat operatively connected to the actuator, the cleat having an elongate stem passing through and depending from the mounting surface, a first arm, and a second arm, each arm extending generally orthogonally from opposite sides of the stem and forming the general shape of an inverted "T"; wherein the stem has a longitudinal axis, and the clamping assembly is configured such that moving the actuator between a first position and a second position causes the cleat simultaneously to rotate on the stem axis and to translate along the stem axis.

B1. The device of paragraph B0, the clamping assembly further including a cam surface operatively connected to the body, and a cam follower configured to interface with the cam surface, the cam follower pivotally coupled to the stem of the cleat.

B2. The device of paragraph B3, wherein the cam follower is rotatable about a cam follower axis, and the cam follower axis is aligned with the stem axis.

B3. The device of paragraph B2, wherein the cam follower is axially coupled to the stem of the cleat by a biasing assembly.

B4. The device of paragraph B3, wherein the biasing assembly includes a plurality of Belleville washers stacked along the stem axis adjacent a surface of the cam follower.

B5. The device of paragraph B1, further including a biasing member configured to axially bias the cleat downward, wherein downward is defined as a direction from the docking surface orthogonally toward the mounting surface.

B6. The device of paragraph B0, wherein the actuator comprises a lever arm rotatable around a lever axis.

B7. The device of paragraph B6, wherein the first position of the lever arm is oriented approximately 90 degrees from the second position of the lever arm.

B8. The device of paragraph B6, wherein the lever axis and the stem axis are substantially parallel to each other.

B9. The device of paragraph B6, wherein the lever axis and the stem axis are substantially perpendicular to each other.

B10. The device of paragraph B6, wherein the lever axis and the stem axis are aligned with each other.

B11. The device of paragraph B10, the clamping assembly further configured such that rotating the lever arm between the first position and the second position causes the lever arm to translate along the lever axis.

B12. The device of paragraph B10, the clamping assembly further configured such that the lever arm remains continuously in a single plane of rotation when rotating the lever arm between the first position and the second position.

B13. The device of paragraph B12, the clamping assembly further including a cam surface disposed on the body and a cam follower configured to interface with the cam surface, the cam follower being pivotally coupled to the stem of the cleat and pivotally coupled to the lever arm.

B14. The device of paragraph B13, wherein the pivotal coupling between the cam follower and the lever arm includes a radial key mated to a grooved keyway, the pivotal coupling configured such that the cam follower maintains angular correspondence with the lever arm and is movable in a direction along the lever arm axis.

B15. The device of paragraph B0, the clamping assembly being a first clamping assembly, the device further including a second clamping assembly substantially identical to and spaced from the first clamping assembly.

B16. The device of paragraph B15, wherein the actuator of the first clamping assembly is disposed on a side of the device opposite from the actuator of the second clamping assembly.

C1. A rack system for mounting on a vehicle having an elongate axis parallel to the direction of vehicular travel, the rack system comprising: a crossbar and a pair of towers configured to mount the crossbar on top of a vehicle, the crossbar being substantially perpendicular to the elongate axis and including an upper surface having formed therein a lengthwise slot having a first lip and a second lip spaced from the first lip at a generally continuous distance defined as a slot width; and a docking device mounted on the crossbar, the docking device including a body having a docking surface oriented generally upward and a mounting surface conforming to the upper surface of the crossbar, and two clamping assemblies spaced from each other along the crossbar, each clamping assembly including an actuator operatively connected to a cleat, the cleat passing through the mounting surface and into the slot in the crossbar; wherein each clamping assembly is configured to interface with the slot in the crossbar such that moving the respective actuator from a first position to a second position causes the respective cleat to rotate and translate into a clamping position clamping a portion of the crossbar between the cleat and the mounting surface of the device, and moving the respective actuator from the second position to the first position causes the respective cleat to rotate and translate into an unclamped position allowing the respective cleat to pass through the slot without interference.

C2. The system of paragraph C1, each cleat comprising an elongated stem portion oriented substantially perpendicular to the crossbar and a cross portion oriented transverse to the stem portion and having a length and a width, the cross portion width being narrower than the slot width and the cross portion length being longer than the slot width.

C3. The system of paragraph C2, wherein the stem and cross portion form the general shape of an inverted T.

C4. The system of paragraph C1, each actuator comprising a lever rotatable around a respective lever axis.

C5. The system of paragraph C4, wherein each lever axis is generally perpendicular to the crossbar and to the elongate axis, the first position of each actuator includes the respective lever being rotated on the lever axis approximately 90 degrees relative to the body of the docking device, and the second position of each actuator includes the respective lever being approximately parallel to the body of the docking device.

C6. The system of paragraph C5, further including a locking device having an elongate pin radially constrained within a bore formed in the body, the locking device configured to prevent repositioning of one of the levers when the pin protrudes into a corresponding aperture in one of the levers.

C7. The system of paragraph C6, the locking device further including a biasing spring operatively connected to the pin, the spring configured to axially bias the pin away from the aperture in the lever.

D1. A rack system for mounting on a vehicle having an elongate axis parallel to the direction of vehicular travel, the rack system comprising: a crossbar and a pair of towers configured to mount the crossbar on top of a vehicle, the crossbar being substantially perpendicular to the elongate axis and including an upper surface having formed therein a lengthwise slot having a first lip and a second lip spaced from the first lip at a generally continuous distance defined as a slot width; and a docking device mounted on the crossbar, the docking device including a body, the body having a docking surface having a docking interface for connecting the body to a cargo-specific rack accessory and a mounting surface spaced from and opposite the docking surface and configured to contact the upper surface of the crossbar, and a clamping assembly operatively connected to the body, the clamping assembly including an actuator and a cleat operatively connected to the actuator, the cleat having an elongate stem passing through and depending from the mounting surface, and an enlarged head portion disposed at a distal end and oriented transverse to the stem; wherein the stem has a longitudinal axis, and the clamping assembly is configured such that moving the actuator between a first position and a second position causes the cleat simultaneously to rotate on the stem axis and to translate along the stem axis.

D2. The system of paragraph D1, wherein the actuator comprises a lever arm rotatable about a lever axis.

D3. The system of paragraph D2, wherein the lever axis and the stem axis are aligned.

D4. The system of paragraph D1, wherein the first position of the lever arm is oriented about 90 degrees from the second position of the lever arm.

D5. The system of paragraph D1, the docking device further including a locking pin disposed in an aperture formed in the body, the locking pin configured to prevent repositioning of the actuator when the pin is in a locked position and to avoid interference with the actuator when the pin is in an unlocked position.

D6. The system of paragraph D5, wherein the locking pin comprises a biasing spring configured to bias the pin toward the unlocked position.

D7. The system of paragraph D6, wherein the pin is configured to be urged from the unlocked position to the locked position by a portion of the cargo-specific rack accessory.

D8. The system of paragraph D1, the clamping assembly further including a cam surface formed on the body, and a cam follower configured to interface with the cam surface, wherein the actuator is pivotally coupled to the cam follower.

E0. A method for attaching a cargo-specific rack accessory to a slotted crossbar, the method including:
attaching a docking device to the accessory, the docking device including an upper docking interface for attaching the accessory, a clamping assembly with a cleat having an enlarged head portion for clamping and unclamping the device to the crossbar, and an actuator for operating the clamping assembly;
moving the actuator on the docking device to an unclamped position;
inserting the cleat of the docking device into the slot in the crossbar;
moving the actuator on the docking device to a clamped position.

E1. The method of paragraph E0, wherein attaching the docking device to the accessory includes attaching the device to the accessory using threaded fasteners projecting from the upper docking interface.

E2. The method of paragraph E0, wherein attaching the docking device to the accessory includes attaching the device to the accessory by sliding a portion of the docking device into a corresponding slot in the accessory.

E3. The method of paragraph E0, further including attaching a second docking device to the accessory.

E4. The method of paragraph E0, wherein moving the actuator to an unclamped position includes rotating a lever arm.

E5. The method of paragraph E0, wherein inserting the cleat into the slot includes sliding the head portion of the cleat into the slot through an end opening of the slot.

E6. The method of paragraph E0, wherein inserting the cleat into the slot includes passing the head portion of the cleat through the slot between opposing lips of the slot.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. A clamping device for use on a crossbar of a vehicle rack, the device comprising:
a body including a docking surface having a docking interface for connecting the body to a cargo-specific rack accessory, and a mounting surface configured to contact an outer surface of a crossbar, the mounting surface being spaced from and opposite the docking surface;
a clamping assembly operatively connected to the body, the clamping assembly including an actuator and a cleat operatively connected to the actuator, the cleat having an elongate stem passing through and depending from the mounting surface, a first arm, and a second arm, each arm extending generally orthogonally from opposite sides of the stem and forming the general shape of an inverted "T";
wherein the stem has a longitudinal axis, and the clamping assembly is configured such that moving the actuator between a first position and a second position causes the cleat simultaneously to rotate on the stem axis and to translate along the stem axis, the clamping assembly further including a cam surface operatively connected to the body, and a cam follower configured to interface with the cam surface, the cam follower pivotally coupled to the stem of the cleat, the cam follower being axially coupled to the stem of the cleat by a biasing assembly, wherein the clamping device further including a biasing member configured to axially bias the cleat downward, wherein downward is defined as a direction from the docking surface orthogonally toward the mounting surface.

2. The device of claim 1, wherein the cam follower is rotatable about a cam follower axis, and the cam follower axis is aligned with the stem axis.

3. The device of claim 1, wherein the biasing assembly includes a plurality of Belleville washers stacked along the stem axis adjacent a surface of the cam follower.

4. The device of claim 1, wherein the actuator comprises a lever arm rotatable around a lever axis.

5. The device of claim 4, wherein the first position of the lever arm is oriented approximately 90 degrees from the second position of the lever arm.

6. The device of claim 4, wherein the lever axis and the stem axis are substantially parallel to each other.

7. The device of claim 4, wherein the lever axis and the stem axis are aligned with each other.

8. The device of claim 7, the clamping assembly further configured such that rotating the lever arm between the first position and the second position causes the lever arm to translate along the lever axis.

9. The device of claim 7, the clamping assembly further configured such that the lever arm remains continuously in a single plane of rotation when rotating the lever arm between the first position and the second position.

10. The device of claim 9, wherein the cam follower is pivotally coupled to the lever arm.

11. The device of claim 10, wherein the pivotal coupling between the cam follower and the lever arm includes a radial key mated to a grooved keyway, the pivotal coupling configured such that the cam follower maintains angular correspondence with the lever arm and is movable in a direction along the lever arm axis.

12. The device of claim 1, the clamping assembly being a first clamping assembly, the device further including a second clamping assembly substantially identical to and spaced from the first clamping assembly.

13. The device of claim 12, wherein the actuator of the first clamping assembly is disposed on a side of the device opposite from the actuator of the second clamping assembly.

14. A clamping device for use on a crossbar of a vehicle rack, the device comprising:
 a body including a docking surface having a docking interface for connecting the body to a cargo-specific rack accessory, and a mounting surface configured to contact an outer surface of a crossbar, the mounting surface being spaced from and opposite the docking surface,
 a clamping assembly operatively connected to the body, the clamping assembly including an actuator and a cleat operatively connected to the actuator, the cleat having an elongate stem passing through and depending from the mounting surface, a first arm, and a second arm, each arm extending generally orthogonally from opposite sides of the stem and forming the general shape of an inverted "T",
 wherein the stem has a longitudinal axis, and the clamping assembly is configured such that moving the actuator between a first position and a second position causes the cleat simultaneously to rotate on the stem axis and to translate along the stem axis, wherein the actuator comprises a lever arm rotatable around a lever axis, the lever axis and the stem axis being aligned with each other, the clamping assembly further configured such that the lever arm remains continuously in a single plane of rotation when rotating the lever arm between the first position and the second position.

* * * * *